(12) United States Patent
Ren et al.

(10) Patent No.: US 12,342,201 B2
(45) Date of Patent: *Jun. 24, 2025

(54) RESOURCE CONFIGURATION FOR CROSS LINK INTERFERENCE MEASUREMENT

(71) Applicant: QUALCOMM INCORPORATED, San Diego, CA (US)

(72) Inventors: Yuwei Ren, Beijing (CN); Huilin Xu, Temecula, CA (US); Ruifeng Ma, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/757,681

(22) PCT Filed: Jan. 8, 2020

(86) PCT No.: PCT/CN2020/070849
§ 371 (c)(1),
(2) Date: Jun. 17, 2022

(87) PCT Pub. No.: WO2021/138827
PCT Pub. Date: Jul. 15, 2021

(65) Prior Publication Data
US 2023/0021157 A1 Jan. 19, 2023

(51) Int. Cl.
*H04W 24/10* (2009.01)
*H04B 17/336* (2015.01)
*H04L 5/00* (2006.01)

(52) U.S. Cl.
CPC .......... *H04W 24/10* (2013.01); *H04B 17/336* (2015.01); *H04L 5/0051* (2013.01)

(58) Field of Classification Search
None
See application file for complete search history.

(56) References Cited

U.S. PATENT DOCUMENTS

2007/0153880 A1* 7/2007 Cartmell ............. H04L 27/0014
375/150
2014/0112378 A1* 4/2014 Ji ......................... H04L 27/266
375/344
(Continued)

FOREIGN PATENT DOCUMENTS

| WO | WO-2014110390 A1 | 7/2014 |
| WO | WO-2014116155 A1 | 7/2014 |
| WO | WO-2018231555 | 12/2018 |

OTHER PUBLICATIONS

Caparra G., et al., "Low Power Selective Denial of Service Attacks Against GNSS", Proceedings of the 31st International Technical Meeting of the Satellite Division of the Institute of Navigation (Ion GNSS+ 2018), The Institute of Navigation, 8551 Rixlew Lane Suite 360 Manassas, VA 20109, USA, Sep. 28, 2018, XP056015003, pp. 3028-3041, Introduction.

(Continued)

*Primary Examiner* — Scott M Sciacca
(74) *Attorney, Agent, or Firm* — Holland & Hart LLP/Qualcomm

(57) ABSTRACT

Methods, systems, and devices for wireless communications are described that improve resource configuration for crosslink interference (CLI) measurement in a wireless communications system. For example, a victim user equipment (UE), may be configured to receive and measure the CLI from one or more aggressors. Specifically, the victim UE may be configured to use a dedicated tracking loop for the CLI measurements to track a dedicated channel of the CLI. Additionally or alternatively, the victim UE may associate CLI with an aggressor identity allowing the CLI resources (Continued)

from the same aggressor to be measured jointly. In another example, an aggressor UE may transmit additional reference signals for a victim UE to measure prior to sounding reference signals. The victim UE may report the CLI measurements to its serving base station.

35 Claims, 22 Drawing Sheets

(56) References Cited

U.S. PATENT DOCUMENTS

| | | | |
|---|---|---|---|
| 2014/0198872 A1 | 7/2014 | Barriac et al. | |
| 2014/0254419 A1 | 9/2014 | Chun et al. | |
| 2014/0313912 A1* | 10/2014 | Jongren | H04B 17/26 370/252 |
| 2014/0355494 A1 | 12/2014 | Jokela et al. | |
| 2015/0319636 A1 | 11/2015 | Lee et al. | |
| 2017/0295000 A1* | 10/2017 | Yoo | H04L 27/2636 |
| 2018/0084553 A1* | 3/2018 | Boyer | H04L 1/1678 |
| 2018/0359069 A1 | 12/2018 | Nam et al. | |
| 2019/0082337 A1* | 3/2019 | Gheorghiu | H04L 5/001 |
| 2022/0104214 A1* | 3/2022 | Ying | H04W 72/1273 |
| 2022/0386156 A1* | 12/2022 | Park | H04W 24/10 |
| 2024/0163701 A1* | 5/2024 | Xu | H04W 24/08 |

OTHER PUBLICATIONS

Supplementary European Search Report—EP20912666—Search Authority—The Hague—Sep. 8, 2023.
AT&T: "Cross-Link Interference Management" 3GPP TSG RAN WG1 Meeting NR#3, R1-1716173, Nagoya, Japan, Sep. 18-21, 2017, Sep. 11, 2017 (Sep. 11, 2017), 2 pages, the whole document.
International Search Report and Written Opinion—PCT/CN2020/070849—ISA/EPO—Sep. 27, 2020.
Media Tek Inc., "Cross-Link Interference Management", 3GPP TSG RAN WG1 Meeting NR#3, R1-1716217, Nagoya, Japan, Sep. 18-21, 2017, Sep. 12, 2017 (Sep. 12, 2017), 5 pages, the whole document.
Nokia, et al.: "On Cross-link Interference Measurement Framework", 3GPP Draft, 3GPP TSG RAN WG1 NR Ad-hoc #3, R1-1715747, On Cross-link Interference Measurement Framework, 3rd Generation Partnership Project (3GPP), Mobile Competence Centre, 650, Route Des Lucioles, F-06921 Sophia-Antipolis Cedex, vol. RAN WG1, No. Nagoya, Japan, Sep. 18, 2017-Sep. 21, 2017, Sep. 17, 2017, XP051339209, 6 pages, Retrieved from the Internet: URL: http://www.3gpp.org/ftp/Meetings_3GPP_SYNC/RAN1/Docs/ [retrieved on Sep. 17, 2017] sections 1-3.
Nokia, et al., "Cross-Link Interference Management for Dynamic TDD", 3GPP Draft, 3GPP TSG RAN WG1 Meeting NR #90, R1-1714265, Prague, Cezech, Republic, Aug. 21-25, 2017, Aug. 11, 2017 (Aug. 11, 2017), 7 Pages, The Whole Document.

* cited by examiner

RESOURCE CONFIGURATION FOR CROSS LINK INTERFERENCE MEASUREMENT

CROSS REFERENCES

The present Application is a 371 national stage filing of International PCT Application No. PCT/CN2020/070849 by Ren et al. entitled "RESOURCE CONFIGURATION FOR CROSS LINK INTERFERENCE MEASUREMENT," filed Jan. 8, 2020; which is assigned to the assignee hereof, and which is expressly incorporated by reference in its entirety herein.

BACKGROUND

The following relates generally to wireless communications, and more specifically to resource configuration for cross link interference measurement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Neighboring cells in a time domain duplexed (TDD) system may use different configurations for TDD communications. In some cases, the different TDD configurations may lead to overlap for transmission in opposite directions. For example, an uplink transmission by a first UE may interfere with downlink reception at a second UE if the uplink transmission and downlink reception are concurrently scheduled. Interference between UEs served by different base stations in a TDD system may be known as cross link interference (CLI). Current techniques for managing CLI in a TDD system may result in inefficient use of communication resources.

SUMMARY

The described techniques relate to improved methods, systems, devices, and apparatuses that support resource configuration for cross link interference (CLI) measurement. Generally, the described techniques provide for measuring, at a victim user equipment (UE), CLI transmissions and reporting the measurements to assist a wireless network in managing CLI.

To manage CLI in a wireless communications system, a victim UE, which may be the victim of UE-to-UE CLI, may be configured to receive and measure CLI from one or more aggressors. Specifically, the victim UE may be configured to use a dedicated tracking loop for the CLI measurements to track a dedicated channel for CLI measurements. The use of a dedicated tracking loop may allow the victim UE to more accurately measure CLI than not using a dedicated tracking loop by improving channel estimation for better demodulation performance. Additionally or alternatively, the victim UE may associate CLI with an aggressor identity allowing the CLI resources from the same aggressor to be measured jointly. For example, the victim UE may estimate time, frequency, and gain of the CLI resources from the same aggressor together instead of as separate resources, which may improve CLI measurement and reduce UE complexity.

In some cases, the aggressor UE may be configured to transmit and the victim UE may be configured to receive one or more reference signals for CLI measurement earlier in a slot than sounding reference signals (SRSs) to provide for a more flexible CLI measurement. For instance, the victim UE may provide a measurement report to its serving cell to assist the network in determining an appropriate tolerance or mitigation action for the UE-to-UE CLI. A first base station providing a first cell may configure the aggressor UE to transmit a reference signal, such as a demodulation reference signal, during an uplink symbol period of a slot. A second base station providing the second cell may configure the victim UE to receive and measure the reference signal during the corresponding downlink symbol periods of the slot. Different configurations for the CLI measurement may be configured. For example, different dedicated tracking loop configurations, association methods, and additional reference signals are considered.

A method of wireless communication at a UE is described. The method may include identifying an interference tracking configuration comprising a dedicated tracking loop for determining crosslink interference using a dedicated channel, measuring crosslink interference in accordance with at least one of a plurality of tracking loops, the plurality of tracking loops including the dedicated tracking loop of the interference tracking configuration, and transmitting, to a base station, measurement feedback based at least in part on the measuring of the crosslink interference.

An apparatus for wireless communication at a UE is described. The apparatus may include a processor, memory coupled with the processor, and instructions stored in the memory. The instructions may be executable by the processor to cause the apparatus to identify an interference tracking configuration comprising a dedicated tracking loop for determining crosslink interference using a dedicated channel, measure crosslink interference in accordance with at least one of a plurality of tracking loops, the plurality of tracking loops including the dedicated tracking loop of the interference tracking configuration, and transmit, to a base station, measurement feedback based at least in part on the measuring of the crosslink interference.

Another apparatus for wireless communication at a UE is described. The apparatus may include means for identifying an interference tracking configuration comprising a dedicated tracking loop for determining crosslink interference using a dedicated channel, means for measuring crosslink interference in accordance with at least one of a plurality of tracking loops, the plurality of tracking loops including the dedicated tracking loop of the interference tracking configuration, and means for transmitting, to a base station, measurement feedback based at least in part on the measuring of the crosslink interference.

A non-transitory computer-readable medium storing code for wireless communication at a UE is described. The code may include instructions executable by a processor to identify an interference tracking configuration comprising a dedicated tracking loop for determining crosslink interference using a dedicated channel, measure crosslink interference in accordance with at least one of a plurality of tracking loops, the plurality of tracking loops including the dedicated tracking loop of the interference tracking configuration, and transmit, to a base station, measurement feedback based at least in part on the measuring of the crosslink interference.

A method of wireless communication at a base station is described. The method may include transmitting, to a UE, an interference tracking configuration comprising a dedicated tracking loop for determining crosslink interference, at the UE, using a dedicated channel, and receiving, from the UE, measurement feedback based at least in part on the interference tracking configuration.

An apparatus for wireless communication at a base station is described. The apparatus may include a processor, memory coupled with the processor, and instructions stored in the memory. The instructions may be executable by the processor to cause the apparatus to transmit, to a UE, an interference tracking configuration comprising a dedicated tracking loop for determining crosslink interference, at the UE, using a dedicated channel, and receive, from the UE, measurement feedback based at least in part on the interference tracking configuration.

Another apparatus for wireless communication at a UE is described. The apparatus may include means for transmitting, to a UE, an interference tracking configuration comprising a dedicated tracking loop for determining crosslink interference, at the UE, using a dedicated channel, and means for receiving, from the UE, measurement feedback based at least in part on the interference tracking configuration.

A non-transitory computer-readable medium storing code for wireless communication at a UE is described. The code may include instructions executable by a processor to transmit, to a UE, an interference tracking configuration comprising a dedicated tracking loop for determining crosslink interference, at the UE, using a dedicated channel, and receive, from the UE, measurement feedback based at least in part on the interference tracking configuration.

DETAILED DESCRIPTION

Figure 1:
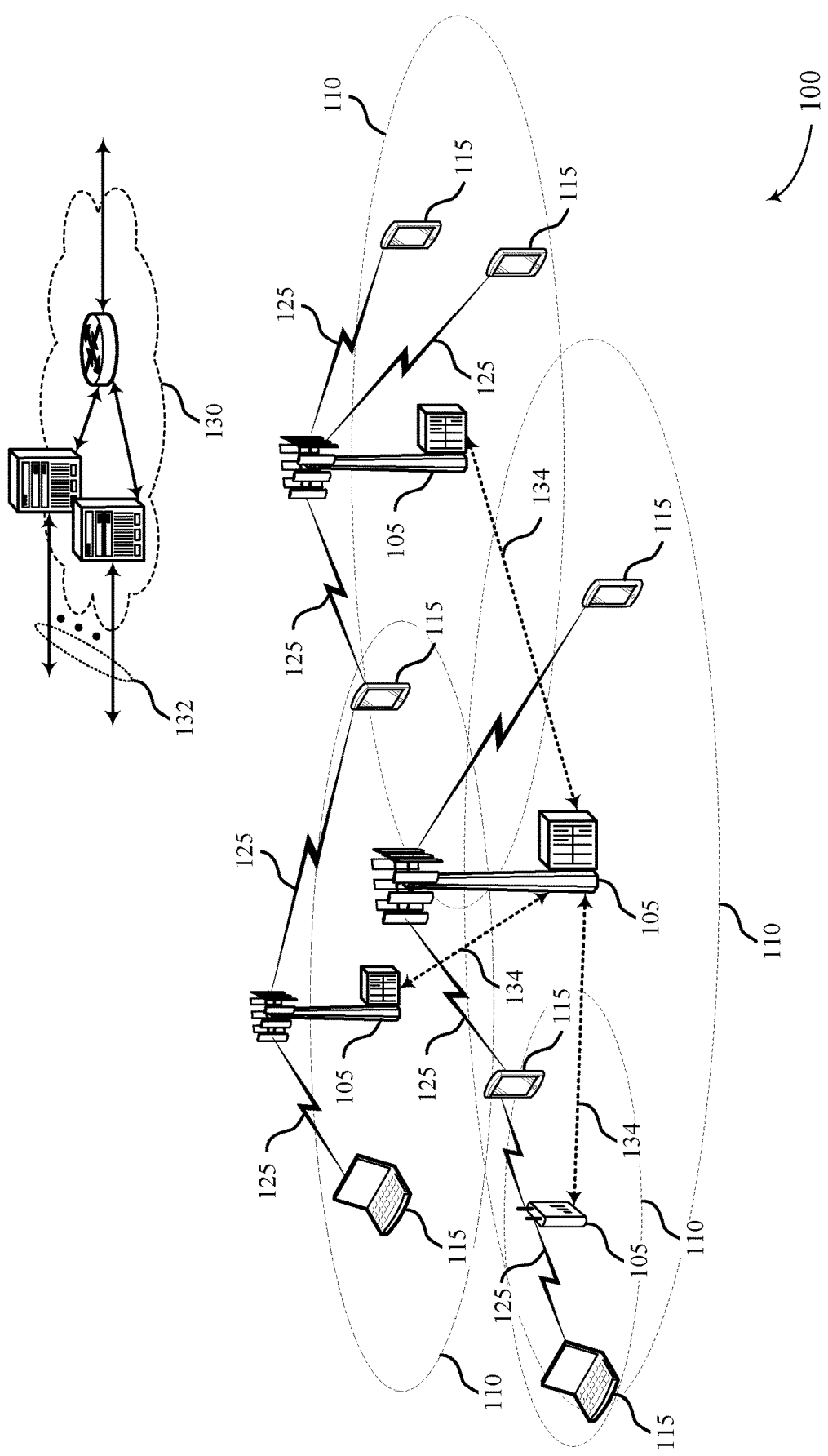
FIG. 1 illustrates an example of a system for wireless communications that supports resource configuration for cross link interference measurement in accordance with aspects of the present disclosure.

A wireless communications system may employ time division duplexed (TDD) communications, where a wireless channel is used for both uplink transmissions and downlink transmissions. In a TDD system with macro cells which provide a wide coverage area, the macro cells may often use the same TDD uplink/downlink configuration. For example, multiple macro cells may use the same slot format which provides, on average, the largest throughput for the large number of users connected to the macro cells. For small cells (e.g., with a cell radius of a few hundred meters), TDD uplink/downlink configurations may dynamically change to follow a change of traffic. For example, if the traffic in a small cell shifts toward being more uplink-heavy, the TDD configuration of the small cell may change to using slots which have more uplink symbol periods. The TDD configuration of the small cell may be dynamically indicated to user equipments (UEs) in the small cell by, for example, a slot format indicator (SFI) in downlink control information. Additionally, or alternatively, the TDD configuration of the small cell may be semi-statically configured by higher layer signaling, such as radio resource control (RRC) signaling.

In some cases, neighboring cells may use different TDD configurations, which may lead to conflicting symbol periods. For example, a symbol period of a first cell may be configured for downlink, where the same symbol period is configured for uplink in a second cell. If a first UE in a first cell is configured for uplink transmission during a symbol period, a second UE in a second cell is configured to receive a downlink transmission during the symbol period, and the first UE and the second UE are in close proximity, the uplink transmission of the first UE may cause interference to reception of the downlink transmission at the second UE. This type of interference may be referred to as cross-link interference (CLI). Generally, differing TDD configurations may result in UE-to-UE CLI when an uplink symbol of one cell collides with a downlink symbol of a nearby cell. CLI may occur near or between cell edge UEs of nearby cells.

To manage CLI in the wireless communications system, a second UE, which would be the victim UE of the UE-to-UE CLI, may be configured to receive and measure the CLI from one or more aggressors. Specifically, the victim UE may be configured to use a dedicated tracking loop for the CLI measurements to track a dedicated channel of the CLI. The use of a dedicated tracking loop may allow the victim UE to more accurately measure CLI than not using a dedicated tracking loop by improving channel estimation for better demodulation performance. Additionally or alternatively, the victim UE may associate CLI with an aggressor identity allowing the CLI resources from the same aggressor to be measured jointly. For example, the victim UE may estimate time, frequency, and gain of the CLI resources from the same aggressor UE together instead of as separate resources, which may improve CLI measurement and reduce victim UE computational complexity. In some examples, associated CLI resources may be estimated together according to a type of quasi-colocation (QCL) or based on a unique UE identifier.

In some cases, the aggressor UE may be configured to transmit and the victim UE may be configured to receive one or more reference signals for CLI measurement earlier in a slot than sounding reference signals (SRSs) to provide for a more flexible CLI measurement. For instance, the victim UE may provide a measurement report to its serving cell to assist the network in determining an appropriate tolerance or mitigation action for the UE-to-UE CLI. A first base station providing the first cell may configure the aggressor UE to transmit a reference signal, such as a demodulation reference signal (DMRS) or phase tracking reference signal (PT-RS), during an uplink symbol period of a slot, which may be scheduled to cause CLI. A second base station providing the second cell may configure the victim UE to receive and measure the reference signal during the corresponding downlink symbol periods of the slot. This early reference signal measurement may introduce a more flexible resource for measurement and fast CLI response.

Aspects of the disclosure are initially described in the context of a wireless communications system. Aspects of the disclosure are further illustrated by and described with reference to apparatus diagrams, system diagrams, and flowcharts that relate to resource configuration for cross link interference measurement.

FIG. 1 illustrates an example of a wireless communications system 100 that supports resource configuration for cross link interference measurement in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, the wireless communications system 100 may use TDD communications, where each base station 105 providing a cell may use a different TDD configuration. In some cases, neighboring cells using different slot formats can lead to conflicting transmission directions in one or more symbol periods. For example, a symbol period of a first cell may be configured for downlink, where the same symbol period is configured for uplink in a second, neighboring cell. If the first UE 115 (i.e., aggressor UE) and the second UE 115 (i.e., victim UE) are in close proximity, the uplink transmission of the first UE 115 may cause interference to reception of the downlink transmission at the second UE 115, which may be referred to CLI. CLI may degrade the signal to interference noise ratio (SINR) within interfered symbols of the victim UE 115.

To improve CLI management in the wireless communications system, a second UE 115, which would be the victim of the UE-to-UE CLI, may be configured to receive and measure the CLI from one or more aggressors with greater accuracy than conventional CLI measurement methods. Specifically, the second UE 115 may be configured to use a dedicated tracking loop for the CLI measurements to track a dedicated channel (e.g., a physical uplink channel of the first UE 115) of the CLI. The use of a dedicated tracking loop may allow the second UE 115 to accurately measure CLI by improving channel estimation for better demodulation performance. For example, time and frequency error may be correctly compensated for, and automatic gain control (AGC) may be properly set to receive the CLI signal.

Additionally or alternatively, the second UE 115 may associate CLI with an aggressor identity allowing the CLI resources from the same aggressor to be measured jointly. For example, the second UE may estimate time, frequency, and gain of the CLI resources from the same aggressor UE 115 together instead of as separate resources, which may improve CLI measurement and reduce UE 115 complexity.

In some cases, the first UE 115 may be configured to transmit and the second UE 115 may be configured receive one or more reference signals for CLI measurement earlier in a slot than SRSs, in addition to SRS, to provide for a more flexible CLI measurement. For instance, the second UE 115 may provide a measurement report to its serving base station 105 to assist the network in determining an appropriate tolerance or mitigation action for the UE-to-UE CLI. A first base station 105 providing the first cell may configure the first UE 115 to transmit a reference signal, such as a DMRS or PT-RS, during an uplink symbol period of a slot. A second base station 105 providing the second cell may configure the second UE 115 to receive and measure the reference signal during the corresponding downlink symbol periods of the slot. Different configurations for improving the CLI measurement may be configured.

Figure 2:
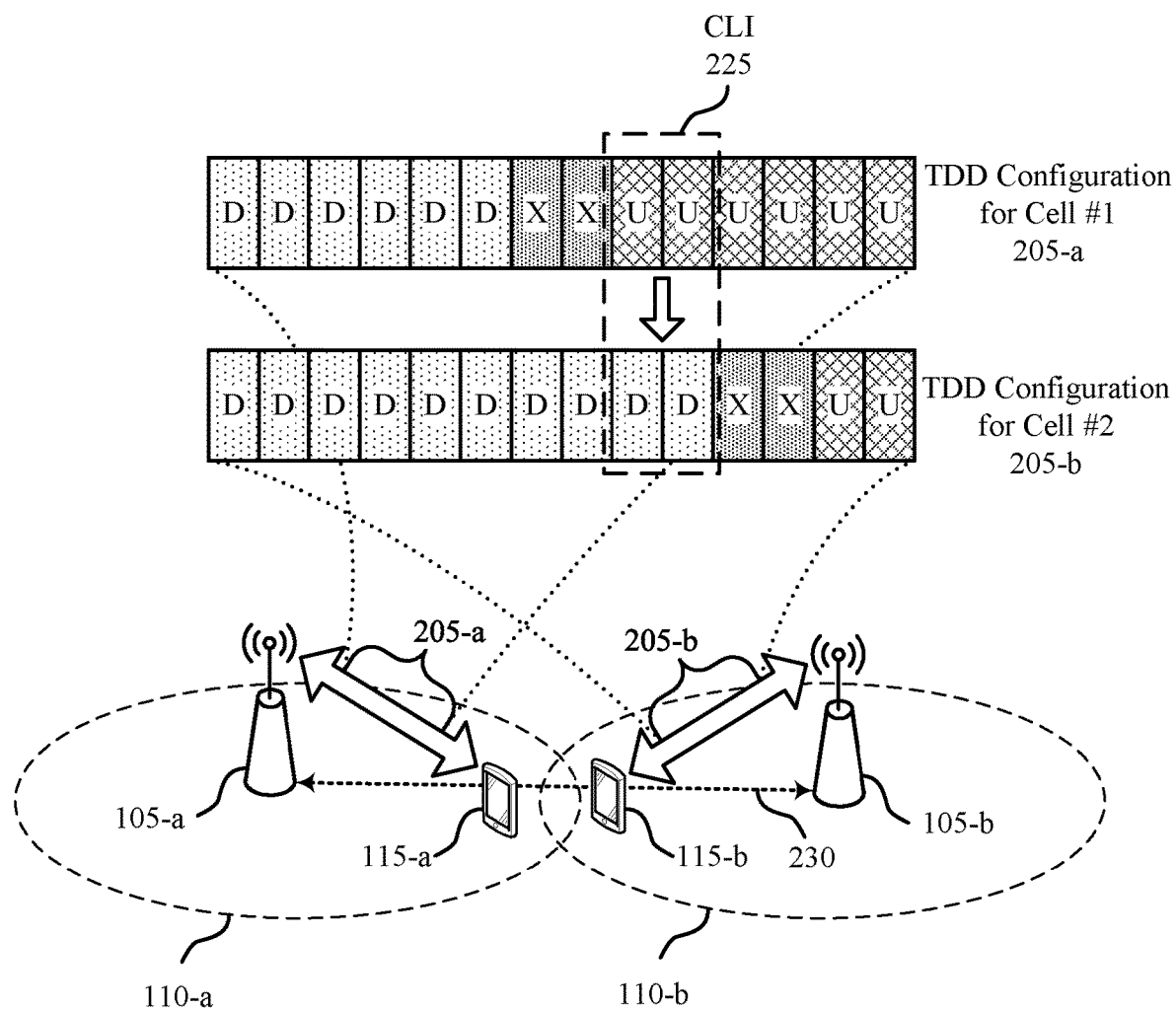
FIG. 2 illustrates an example of a wireless communications system that supports resource configuration for cross link interference measurement in accordance with aspects of the present disclosure.

FIG. 2 illustrates an example of a wireless communications system 200 that supports resource configuration for cross link interference measurement in accordance with aspects of the present disclosure. In some examples, wireless communications system 200 may implement aspects of wireless communications system 100. The wireless communications system 200 may include UE 115-*a* and UE 115-*b*, which may each be an example of a UE 115 as described herein. The wireless communications system 200 may also include base station 105-*a* and base station 105-*b*, which may each be an example of a base station 105 as described herein. The base stations 105 may each be associated with a cell which provides wireless communications with the base station 105 within a coverage area 110. For example, base station 105-*a* may provide a cell within coverage area 110-*a*, and base station 105-*b* may provide a cell within coverage area 110-*b*.

The wireless communications system 200 may employ TDD communications, where a wireless communications frequency channel is used for both uplink transmissions and downlink transmissions. Each cell may configure a TDD configuration 205 for the cell. For example, the first cell of base station 105-*a* may use a first TDD configuration 205-*a*, and the second cell of base station 105-*b* may use a second TDD configuration 205-*b*. UEs 115 in these cells may communicate with the base station 105 based on the corresponding TDD configuration 205 for the cell. For example, a slot of a TDD configuration 205 may include symbol periods for downlink symbols 210, flexible symbols 215, or uplink symbols 220, or any combination thereof. The base station 105 may transmit a downlink transmission in a downlink symbol 210, and the UE 115 may transmit an uplink transmission in an uplink symbol 220. Flexible symbols 215 may, in some cases, be used as guard periods between the uplink transmissions and downlink transmissions. A guard period may prevent inter-symbol interference or may provide time for a UE 115 to adjust radio frequency hardware. In some cases, a flexible symbol 215 may be dynamically reconfigured to either a downlink symbol 210 or an uplink symbol 220.

The base stations 105 may dynamically change the TDD configurations 205. In an example, the traffic in the first cell may shift toward being more uplink-heavy, so the first TDD configuration 205-a of the first cell may change to using a slot configuration which has more uplink symbol periods. In some cases, a TDD configuration 205 may be dynamically indicated to UEs in the cell by an SFI in DCI. The DCI conveying the SFI may be transmitted in one of the first few downlink symbols 210 of a slot and may convey TDD configuration 205 for one or more additional slots. That is, for the illustrated slot, the SFI including the TDD configuration 205 may be received in the slot, or in a previous slot. Additionally or alternatively, the TDD configuration 250 may be semi-statically configured (e.g., included in an RRC configuration) by higher layer signaling, such as RRC signaling.

In some cases, different TDD configurations 205 used by neighboring cells may lead to conflicting transmission directions for some symbol periods of a slot. For example, the 9th and 10th symbol periods of the slot shown may have conflicting directions for the first TDD configuration 205-a and the second TDD configuration 205-b. TDD configuration 205-a may have uplink symbols 220 configured when TDD configuration 205-b has downlink symbols 210 configured. Therefore, UE 115-a in the first cell may be configured to transmit an uplink transmission while UE 115-b in the second cell is configured to receive a downlink transmission. The first cell and the second cell may be neighboring cells, and UE 115-b and UE 115-a may be near each other at the edge of their respective cells. In some cases, the uplink transmission of UE 115-a may cause interference to reception of the downlink transmission at UE 115-b. This type of interference may be referred to as UE-to-UE CLI, shown by CLI 225 at the conflicting symbol periods. UE-to-UE CLI may degrade the SINR within interfered symbols of the victim UE 115-b. Generally, differing TDD configurations 205 may result in UE-to-UE CLI 225 when an uplink symbol of one cell collides with a downlink symbol of another nearby cell. CLI 225 may occur near or between cell edge UEs of nearby cells. The UE 115 transmitting the uplink signal (e.g., UE 115-a here) may be referred to as the aggressor UE 115, and the UE 115 which is receiving the affected downlink transmission (e.g., UE 115-b here) may be referred to as the victim UE 115. In some cases, the CLI 225 may occur between one or more aggressor UEs 115 and one or more victim UEs 115.

In some cases, UE 115-b may measure CLI 225 from UE 115-a using SRS reference signal receive power (RSRP) or received signal strength indicator (RSSI) or both. The SRS-RSRP may be the linear average of the power contributions of the SRS that are measured over the configured resource elements within the considered measurement frequency bandwidth in the time resources in the configured measurement occasions, and a measurement resource for SRS-RSRP measurement may be configured by an SRS resource configuration from base station 105-b. The RSSI may be the linear average of the total received power observed in certain OFDM symbols of one or more measurement time resources, within the measurement bandwidth, over the configured resource elements for measurement by the UE 115-b, and a measurement resource for RSSI measurement may be configured by a symbol-level indication (e.g., starting offset and ending offset) and physical resource block (PRB) level indication (e.g., starting PRB and ending PRB) within an active downlink BWP. Layer three measurement reporting may be used by UE 115-b to inform base station 105-b of an SRS-RSRP and CLI-RSSI measurement report, however, these measurements may have poor performance as they may be updated slowly and may quickly become outdated. Specifically, these CLI 225 measurement methods should be improved for the full-duplex and sidelink scenarios when CLI 225 measurement performance may be important.

To improve management of CLI 225 in the wireless communications system 200, improved measurement of CLI 225 resources may be configured at UEs 115. For example, a second UE 115-b, which would be the victim UE 115 of the UE-to-UE CLI 225, may be configured to receive and measure the CLI 225 from one or more aggressors. Specifically, the victim UE 115-b may be configured to use a dedicated tracking loop for the CLI 225 measurements to track the time, frequency, and gain of a dedicated channel of the CLI 225, such as the physical uplink control channel (PUCCH), the physical uplink shared channel (PUSCH), or DMRS on the PUCCH or PUSCH. The use of a dedicated tracking loop may allow the victim UE 115-b to more accurately measure CLI 225 than not using a dedicated tracking loop by improving channel estimation for better demodulation performance. For instance, a dedicated tracking loop may improve channel estimation by tracking the automatic gain control (AGC) value, phase compensation, and other parameters for the dedicated signals. The use of a dedicated tracking loop may allow time and frequency error to be correctly compensated for and AGC to be properly set to receive the CLI 225 signal.

UE 115-b may be configured to use a dedicated tracking loop for CLI 225 signal reception to enhance CLI 225 measurement performance. In some examples, a dedicated tracking loop may be configured, by the base station 105-b, for the UE 115-b for the CLI 225 measurement, and one message, from the base station 105-b to UE 115-b, may be used to instruct the UE 115-b to use dedicated tracking loops for CLI 225 signal reception. This message may be indicated from base station 105-b by downlink control information (DCI), a medium access control-control element (MAC-CE), or a radio resource control (RRC) message. In another example, the use of dedicated tracking loops is configured as the default, at UE 115-b, and thus may not use the aforementioned message to trigger the use of the dedicated tracking loop as the UE 115-b may always optionally use dedicated tracking loops for CLI 225 measurements.

If UE 115-b does not support the use of dedicated tracking loops for the CLI 225 signal reception or UE 115-b does not have the capability to use of dedicated tracking loops for the CLI 225 signal reception, then UE 115-b may report an indicator that shows the CLI 225 measurement is not based on the use of dedicated tracking loops. In some cases, the UE 115-b may report indicator with the CLI 225 measurement feedback, or the indicator may be reported with the UE 115-b capability information in the beginning of communications between base station 150-b and UE 115-b. For example, this indication may be included in the UE 115-b capability report.

Additionally or alternatively, the victim UE 115-b may associate CLI 225 with an aggressor identity allowing the CLI 225 resources from the same aggressor to be measured jointly to enhance CLI 225 measurement performance. For example, the victim UE 115-*b* may estimate time, frequency, and gain of the CLI 225 resources from the same aggressor UE 115-*a* together instead of as separate resources, which may improve CLI 225 measurement and reduce victim UE 115-*b* computational complexity. In some examples, associated CLI 225 resources may be estimated together according to a type of QCL or based on a unique UE 115-*a* identifier. Association configurations may be shared between base stations 105-*a* and 105-*b* through backhaul link 230.

In some cases, the aggressor UE 115-*a* may be configured to transmit and the victim UE 115-*b* may be configured receive one or more reference signals for CLI measurement earlier in a slot than SRSs to provide for a more flexible CLI 225 measurement, which may enhance CLI 225 measurement performance. For instance, the victim UE 115-*b* may provide a measurement report to its serving base station 105-*b* to assist the network in determining an appropriate tolerance or mitigation action for the UE-to-UE CLI 225. A first base station 105-*a* providing the first cell may configure the aggressor UE 115-*a* to transmit a reference signal, such as a DMRS or PT-RS, during an uplink symbol period 220 of a slot, which may be scheduled to cause CLI 225. A second base station 105-*b* providing the second cell may configure the victim UE 115-*b* to receive and measure the reference signal during the corresponding downlink symbol periods 210 of the slot. This early reference signal measurement may introduce a more flexible resource for measurement and fast CLI 225 response by the network. Reference signal configurations may be shared between base stations 105-*a* and 105-*b* through backhaul link 230.

As described herein, the CLI measurement may be RSRP, RSRQ, or RSSI measurements, or a combination of these measurements. RSRP may measure the received reference signal power of a configured reference signal resource. RSSI may indicate the total received power (e.g., including thermal noise, interference, signal strength, etc.) measured in select OFDM symbols. The measurements may be based on SRS at different levels. For example, the measurements may be cell-specific, where all UEs 115 in a cell transmit the same SRS. In some cases, the measurements may be group-specific, where a subset of UEs 115 in the cell transmit the same SRS. In some examples, the measurements may be UE-specific, where each UE 115 in the cell transmits a distinct SRS unique to the UE 115. This may provide different levels of granularity for determining CLI strength, tolerance, and impact.

Although illustrated in FIG. 2 as being between UEs served by different cells associated with different base stations, CLI may occur within a single cell. For example, the operations of base station 105-*a* and base station 105-*b* may actually be performed by a single base station 105 to manage CLI which occurs within the cell provided by the single base station 105. This may occur based on the single base station 105 configuring different TDD configurations for UEs 115 within the cell (e.g., different TDD configurations for different UEs).

Figure 3A:
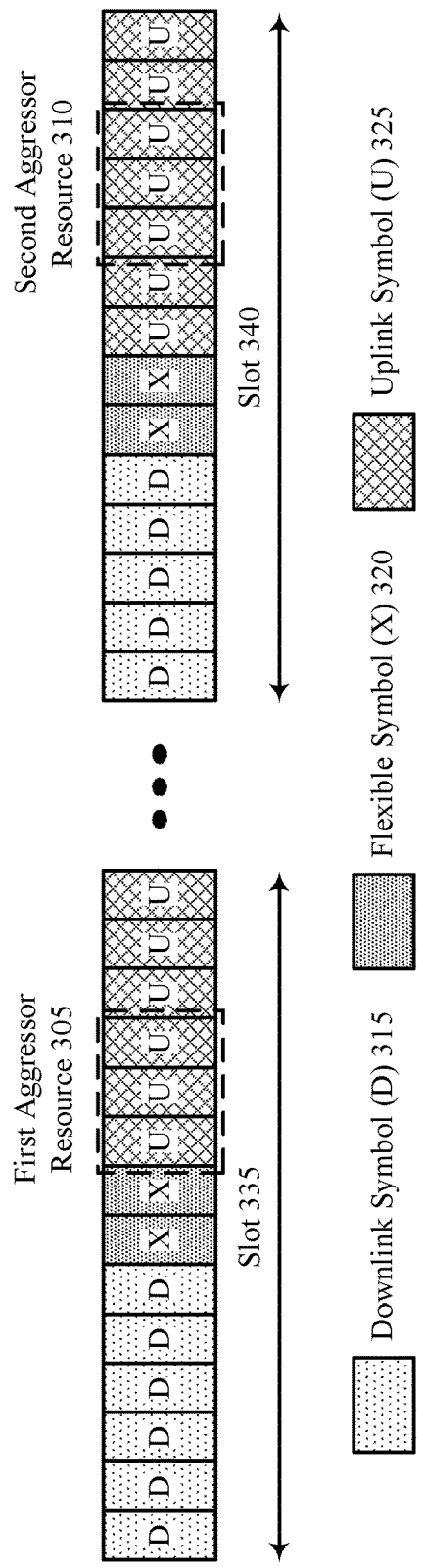
FIGS. 3A and 3B illustrate examples of a CLI measurement configuration that supports resource configuration for cross link interference measurement in accordance with aspects of the present disclosure.
Figure 3B:
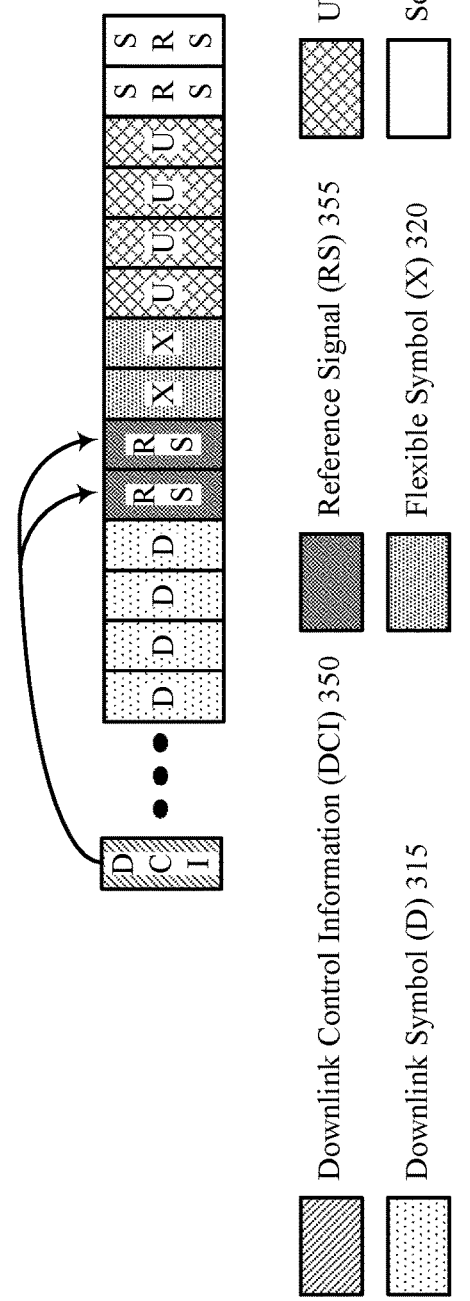

FIGS. 3A and 3B illustrate examples of a CLI measurement configuration 300-*a* and 300-*b* that support resource configuration for cross link interference measurement in accordance with aspects of the present disclosure. In some examples, CLI measurement configurations 300 may implement aspects of wireless communications system 100.

FIG. 3A shows an example of CLI measurement configuration 300-*a*. As described in FIG. 2, a wireless communications system may employ multiple cells, where each cell is capable of using a different dynamic TDD configuration. A TDD configuration may include a symbol pattern for a slot 335 and slot 340, including symbol periods for downlink symbols 315, flexible symbols 320, uplink symbols 325 or a combination thereof. In some cases, the TDD configuration may cause CLI at another UE 115.

In some cases, the victim UE 115 may associate CLI with an aggressor identity allowing the CLI resources (e.g., first aggressor resource 305 and second aggressor resource 310) from the same aggressor to be measured jointly to enhance CLI 225 measurement performance. For example, the victim UE 115 may estimate time, frequency, and gain of the first aggressor resource 305 and second aggressor resource 310, which may be from the same aggressor UE 115, together instead of as separate resources. This joint estimation may improve the CLI measurement and reduce the victim UE 115 computational complexity.

Associated CLI resources may be estimated together according to a type of QCL. Two antenna ports are said to be QCL if properties of the channel over which a symbol on one antenna port is conveyed can be inferred from the channel over which a symbol on the other antenna port is conveyed. For example, a first signal may be QCLed with a second signal, which means that the two signals have gone through very similar channel conditions, and it is highly likely that the two signals are from the same location (e.g., the same place and same antenna). More specifically, it may imply that the two signals are transmitted from the same transmission reception point (TRP) (i.e., antenna array) that applies the same spatial filter. Since the two signal reached the receiver through similar channel, if the receiver can detect one of the signals and determine the channel properties of the signal, the determination will greatly help to detect the other signal. Antenna ports may be QCL four different ways, and the QCL types may include QCL-Type A where doppler shift, doppler spread, average delay, and delay spread are very similar if not the same for both signals, QCL-Type B where doppler shift and doppler spread are very similar if not the same for both signals, QCL-Type C where doppler shift and average delay are very similar if not the same for both signals, and QCL-Type D where spatial receive parameters are very similar if not the same for both signals.

In some cases, a victim UE 115 may associate CLI resources that are transmitted from the same CLI aggressor UE 115. The CLI resources may be associated based on a configured resource pattern that follows the QCL framework. For example, victim UE 115 may use a first resource transmitted by the CLI aggressor as a source (e.g., first aggressor resource 305) and a second resource as a target (e.g., second aggressor resource 310) transmitted by the CLI aggressor. The victim UE 115 may associate and QCL the first aggressor resource 305 with the second aggressor resource 310 based on the configured resource pattern set by base station 105. In some examples, the first aggressor resource 305 and the second aggressor resource 310 may be an RSSI resource or a reference signal (e.g., an SRS). The QCL type (e.g., A, B, C, D, or another type) may be indicated to the victim UE 115 in a dummy parameter, from the serving base station 105 or the aggressor UE 115, as to indicate how signals from the same CLI aggressor should be QCLed with respect to average doppler, doppler shift, average delay, delay spread, and spatial receive parameters. The resource pattern to be followed in slots 335 and 340 by the aggressor UE 115 and received by the victim UE 115 may be configured by the network and sent to the aggressor UE 115 and the victim UE 115 from their respective base stations 105, which may be in communication with each other.

In another example, a victim UE 115 may associate CLI resources (e.g., the first aggressor resource 305 and the second aggressor resource 310) that are transmitted from the same CLI aggressor UE 115 to process the CLI resources together instead of separately to improve channel estimation and demodulation of the CLI. The first aggressor resource 305 and the second aggressor resource 310 may be associated at the victim UE 115 based on a unique aggressor UE 115 identifier (ID) in each of the first aggressor resource 305 and the second aggressor resource 310. For example, the UE ID may be the aggressor UE's 115 international mobile subscriber identity (IMSI) and a paging occasion index, the UE-specific radio network temporary identifier (RNTI) (e.g., C-RNTI, MCS-C-RNTI) and the cell ID, a device-to-device ID, a mobile subscriber identification number (MSIN), or any combination thereof. For instance, the UE ID may be the unique IMSI or a function of the IMSI, such as the UE ID being equal to the 1024 modular exponentiation of the IMSI (i.e., UE_ID=IMSI mod 1024). In another example, the UE ID may be the UE paging occasion index or a function thereof (e.g., $i_s$=mod(floor ($UE_{ID}/N$), $N_s$ where $i_s$ is the UE paging occasion index, mod is the modular exponentiation function, floor is the floor function and N is the symbol number). If a UE 115 has a sidelink, then the UE ID for sidelink may be used as the UE ID for CLI association. For example, a D2D-ID may be used to identify the UE 115 in the D2D communication. In some cases, the D2D-ID may be a transformation of the MSIN. In yet another example, the UE ID may be a combination of the UE specific RNTI (e.g., C-RNTI, MCS-C-RNTI) and cell ID, such that the aggressor UE 115 may be identified by the combination of RNTI and Cell ID.

FIG. 3B shows an example of CLI measurement configuration 300-*b*. As described in FIG. 2, a wireless communications system may employ multiple cells, where each cell is capable of using a different dynamic TDD configuration. A TDD configuration may include a symbol pattern for a slot, including symbol periods for DCI 350, downlink symbols 315, reference signals 355, flexible symbols 320, uplink symbols 325, SRS 330, or a combination thereof. In some cases, the TDD configuration may cause CLI at another UE 115.

In some cases, an aggressor UE 115 may be configured with CLI measurement configuration 300-*b*, such that the aggressor UE 115 may receive DCI 350 scheduling the aggressor UE to transmit one or more reference signals 355 for CLI measurement earlier in a slot than SRSs 330, and the reference signals 355 may be received by the victim UE 115-*b*. The reference signals 355 may provide for a more flexible CLI measurement than previous measurements (e.g., based on SRS 330 or RSSI), and these reference signals 355 and associated measurements may enhance CLI measurement performance at the victim UE 115. In some cases, SRS 330 is transmitted in the last few symbols of a slot, which is not a flexible measurement reference. Also, SRS may cause uplink overhead at the aggressor UE 115, and CLI RSSI may not provide coherent information for the CLI, such as an interference covariance matrix, based on the long term measurement of RSSI.

For example, the victim UE 115 may provide a measurement report to its serving base station 105 to assist the network in determining an appropriate tolerance or mitigation action for the UE-to-UE CLI. A first base station 105 may configure the aggressor UE 115 to transmit a reference signal, such as a DMRS or PT-RS, during a reference signal symbol period 355 of a slot. In some cases, reference signal symbol period 355 may be scheduled to cause CLI with the victim UE 115. A second base station 105 may configure the victim UE 115 to receive and measure the reference signals prior to receiving the SRS symbol period 330. This early reference signal measurement may introduce a more flexible resource for measurement and fast CLI mitigation response by the network. The reference signal 355 configurations may be shared between base stations 105 using a backhaul link.

The reference signal symbol period 355 may be configured at the aggressor UE 115 to transmit PUSCH DMRS and PT-RS for CLI measurement by the victim UE 115. DCI 350 may be used to indicate and CLI measurement configuration 300-*b* to the aggressor UE and victim UE for more dynamic CLI measurements with respect to SRS 330 or RSSI CLI measurements. For example, the PUSCH DMRS or PT-RS in reference signal symbol periods 355 (e.g., at the fifth and sixth symbols in the slot, or other symbols before SRS 330) could be configured in addition to SRS symbol periods 330 at the end of the slot.

Figure 4:
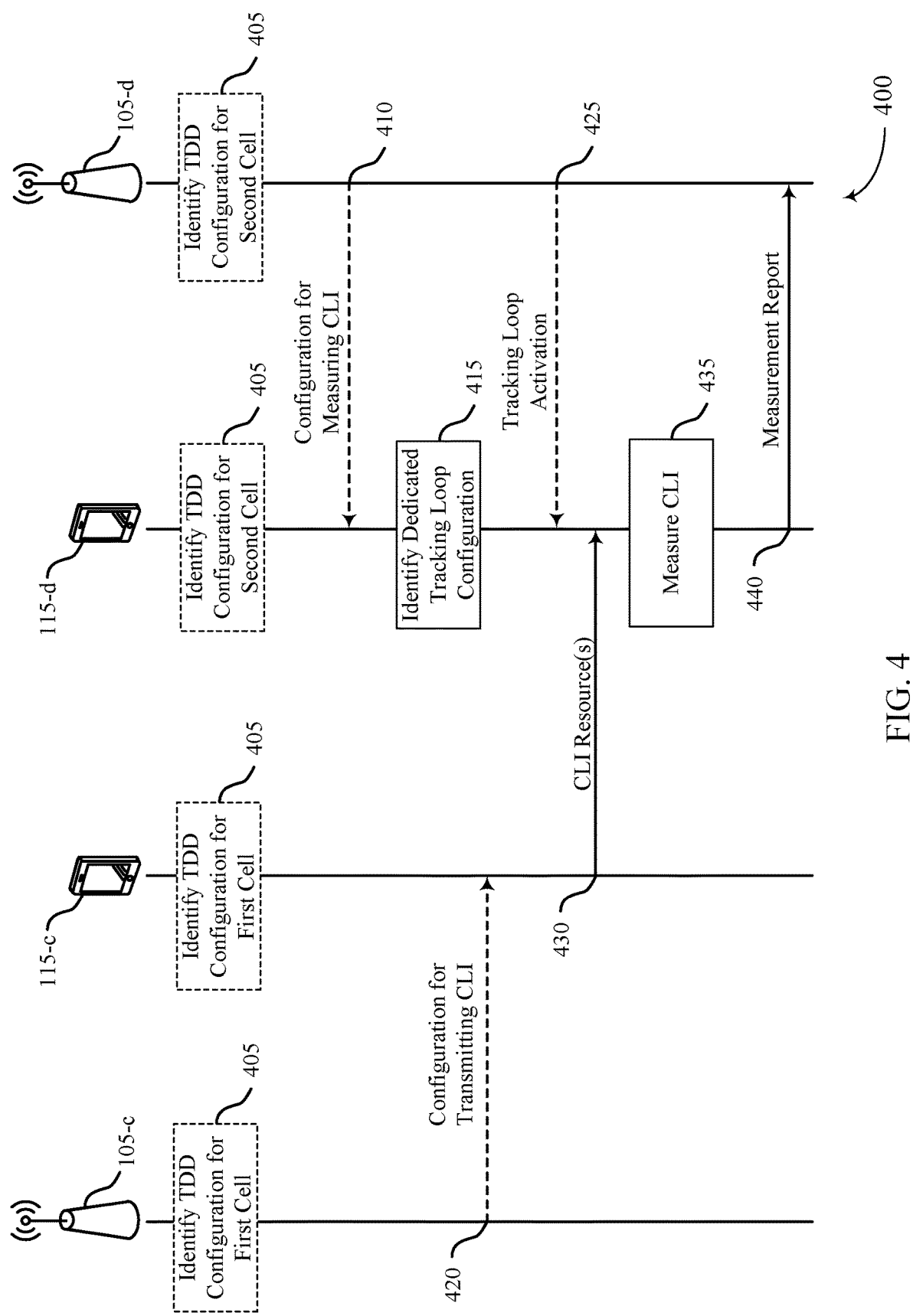
FIG. 4 illustrates an example of a process flow that supports resource configuration for cross link interference measurement in accordance with aspects of the present disclosure.

FIG. 4 illustrates an example of a process flow 400 that supports resource configuration for cross link interference measurement in accordance with aspects of the present disclosure. In some examples, process flow 400 may implement aspects of wireless communications system 100. The process flow 400 may include UE 115-*c* and UE 115-*d*, which may each be an example of a UE 115 as described herein. The process flow 400 also includes base station 105-*c* and base station 105-*d*, which may each be an example of a base station 105 as described herein. The base stations 105 may each be associated with a cell which provides wireless communications to UEs 115 with the base station 105 within a coverage area. UE 115-*c* may be served by a first cell associated with base station 105-*c*, and UE 115-*d* may be served by a second cell associated with base station 105-*d*. Alternative examples of the following process flow may be implemented, where some steps are performed in a different order than described or are not performed at all. In some cases, steps may include additional features not mentioned below, or further steps may be added.

At 405, UE 115-*c* may identify a TDD configuration for the first cell, where the TDD configuration includes a symbol pattern for a slot of a set of slots. UE 115-*d* may identify a TDD configuration for the second cell, where the TDD configuration includes a symbol pattern for the slot of the set of slots. Base station 105-*c* may identify a first TDD configuration for the first cell of base station 105-*c*, where the first TDD configuration includes a first symbol pattern for the first cell for the slot. Base station 105-*d* may identify a second TDD configuration for the second cell of base station 105-*d*, where the second TDD configuration includes a second symbol pattern for the second cell for the slot.

At 410, base station 105-*d* may transmit and UE 115-*d* may receive a configuration for measuring CLI. The configuration may include an interference tracking configuration including a dedicated tracking loop for determining CLI, at the UE 115-*d*, using a dedicated channel. In some cases, the configuration may include an association indication pertaining to an aggressor UE 115-*c*, which is a source of the crosslink interference measured by the UE 115-*d*. Additionally or alternatively, the configuration may include DCI indicating a dynamic reference signal configuration.

At 415, the UE 115-*d* may identify a dedicated tracking loop, which may be based on the configuration received at 410. For example, UE 115-*d* may identify an interference tracking configuration including a dedicated tracking loop for determining CLI using a dedicated channel. In some cases, an association configuration or early reference signal configuration, or both, may also be configured at the UE 115-d.

At 420, base station 105-c may transmit and UE 115-c may receive a configuration for transmitting CLI. For example, the configuration may include a resource pattern indication to be used by UE 115-d for association and QCL. In another example, the configuration may include instructions to include a UE ID in each CLI transmission for detection and association of CLI aggressor resources by UE 115-d. In yet another example, the configuration may include DCI indicating a dynamic reference signal configuration, where additional reference signals may be transmitted by UE 115-c prior to SRS within the CLI at 430.

At 425, base station 105-d may transmit and UE 115-d may receive an activation message that triggers the use of the dedicated tracking loop for measuring CLI. In other cases, the use of the dedicated tracking loop for measuring CLI may be a default configuration present at UE 115-d and be active without message 425.

At 430, UE 115-c may transmit and UE 115-d may receive CLI according to the configuration identified at 415, which may include one or more CLI resources. For instance, multiple CLI resources may be transmitted by UE 115-c that may be associated together by UE 115-d for joint estimation. Additionally or alternatively, early DMRS or PT-RS may be transmitted in addition to SRS.

At 435, UE 115-d may measure CLI in accordance with at least one of a set of tracking loops, the set of tracking loops including the dedicated tracking loop of the interference tracking configuration. In some examples, UE 115-d may measure CLI based on receiving, from the aggressor UE 115-c, a first interfering transmission and a second interfering transmission, and estimating the CLI arising from the first interfering transmission and the second interfering transmission together based on the association indication configured by configuration message received at 410. In some cases, UE 115-d may measure CLI based on receiving, from an aggressor UE 115-c, which is a source of the CLI measured by the UE 115-d, a first reference signal earlier in a subframe than symbols in which an SRS is received by UE 115-d, and UE 115-d may measure the CLI based on the early reference signal.

At 440, UE 115-d may transmit and base station 105-d may receive a measurement report including measurement feedback based on the measuring of the CLI at 435. In some cases, base station 105-d may share the measurement report with base station 105-c for future CLI mitigation.

Figure 5:
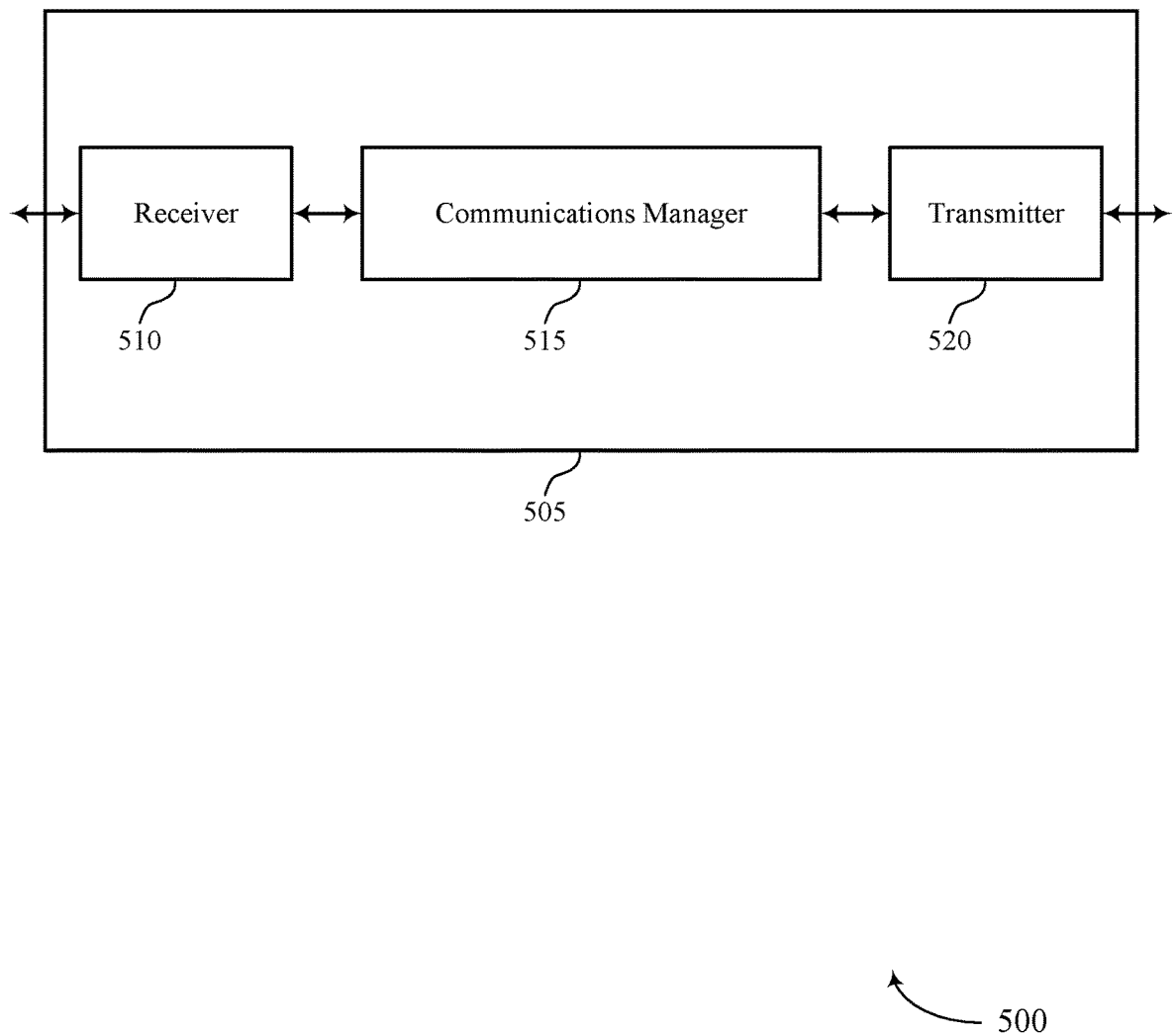
FIGS. 5 and 6 show block diagrams of devices that support resource configuration for cross link interference measurement in accordance with aspects of the present disclosure.

FIG. 5 shows a block diagram 500 of a device 505 that supports resource configuration for cross link interference measurement in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource configuration for cross link interference measurement, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify an interference tracking configuration including a dedicated tracking loop for determining crosslink interference using a dedicated channel, measure crosslink interference in accordance with at least one of a set of tracking loops, the set of tracking loops including the dedicated tracking loop of the interference tracking configuration, and transmit, to a base station, measurement feedback based on the measuring of the crosslink interference. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
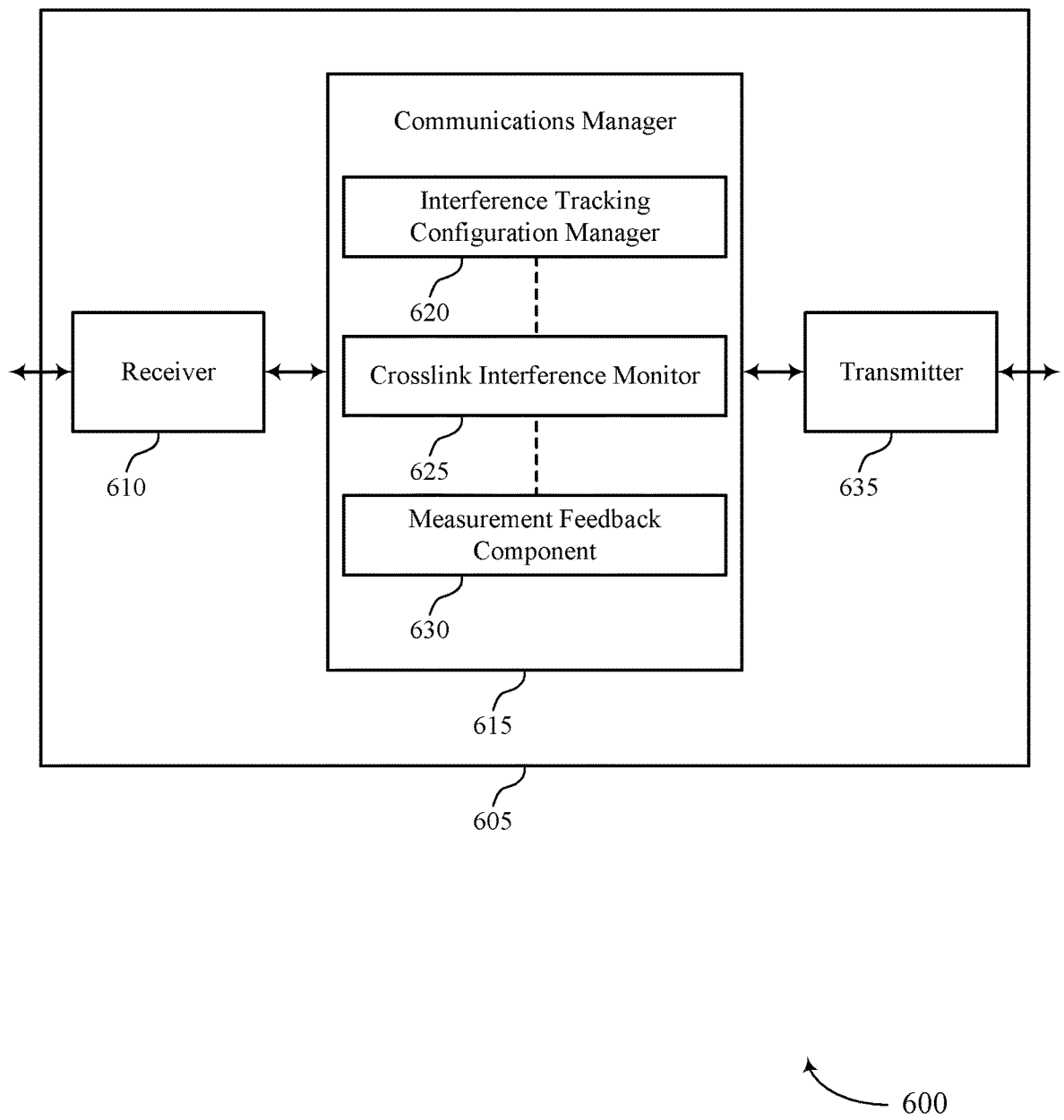

FIG. 6 shows a block diagram 600 of a device 605 that supports resource configuration for cross link interference measurement in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to resource configuration for cross link interference measurement, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an interference tracking configuration manager 620, a crosslink interference monitor 625, and a measurement feedback component 630. The communications manager 615 may be an example of aspects of the communications manager 810 described herein.

The interference tracking configuration manager 620 may identify an interference tracking configuration including a dedicated tracking loop for determining crosslink interference using a dedicated channel.

The crosslink interference monitor 625 may measure crosslink interference in accordance with at least one of a set of tracking loops, the set of tracking loops including the dedicated tracking loop of the interference tracking configuration.

The measurement feedback component 630 may transmit, to a base station, measurement feedback based on the measuring of the crosslink interference.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
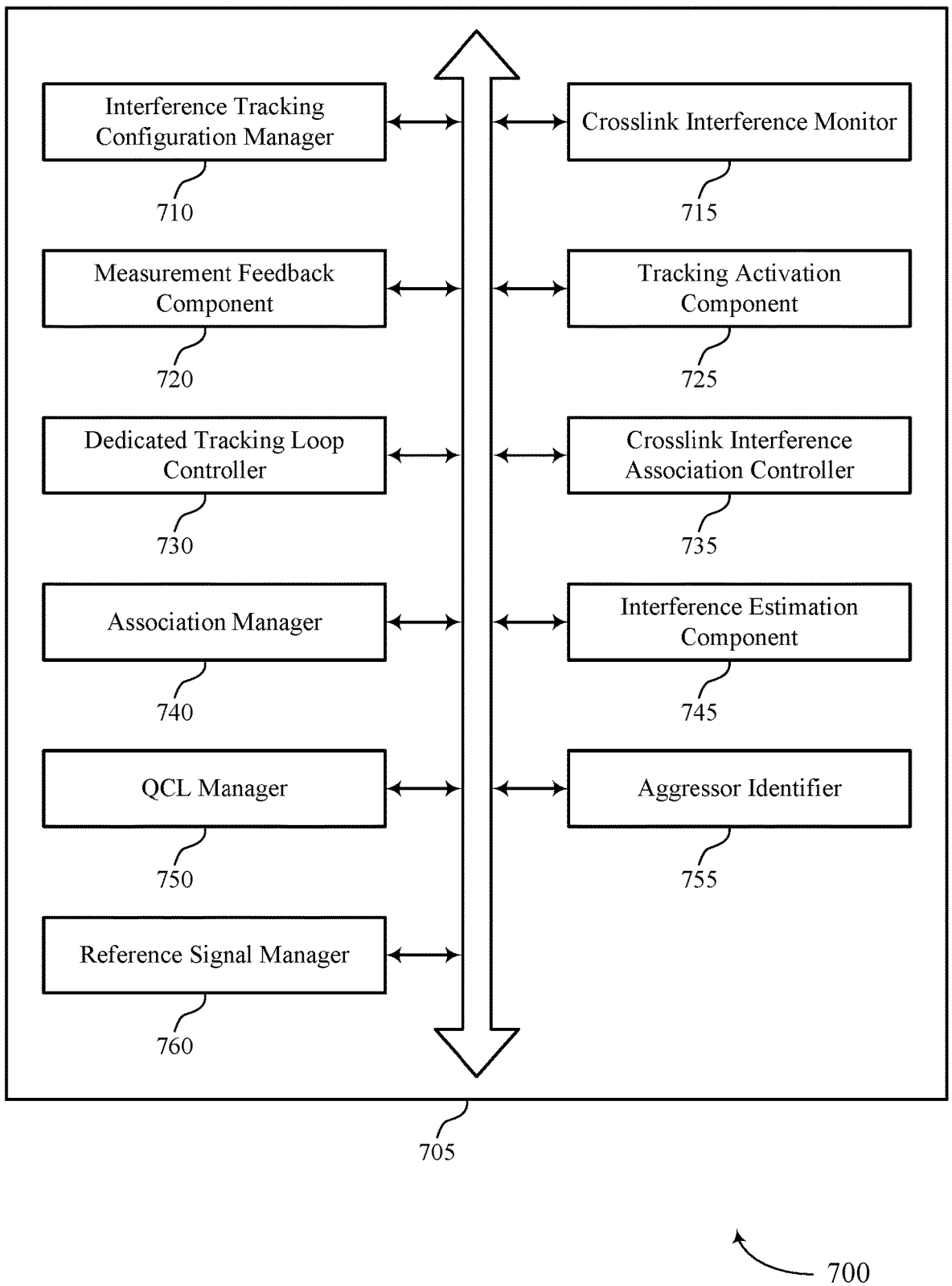
FIG. 7 shows a block diagram of a communications manager that supports resource configuration for cross link interference measurement in accordance with aspects of the present disclosure.

FIG. 7 shows a block diagram 700 of a communications manager 705 that supports resource configuration for cross link interference measurement in accordance with aspects of the present disclosure. The communications manager 705 may be an example of aspects of a communications manager 515, a communications manager 615, or a communications manager 810 described herein. The communications manager 705 may include an interference tracking configuration manager 710, a crosslink interference monitor 715, a measurement feedback component 720, a tracking activation component 725, a dedicated tracking loop controller 730, a crosslink interference association controller 735, an association manager 740, an interference estimation component 745, a QCL manager 750, an aggressor identifier 755, and a reference signal manager 760. Each of these modules may communicate, directly or indirectly, with one another (e.g., via one or more buses).

The interference tracking configuration manager 710 may identify an interference tracking configuration including a dedicated tracking loop for determining crosslink interference using a dedicated channel.

In some examples, the interference tracking configuration manager 710 may receive the interference tracking configuration via a configuration message from the base station.

In some examples, the interference tracking configuration manager 710 may receive the activation message via downlink control information, a medium access control-control entity, or a radio resource control message.

In some cases, the interference tracking configuration is a default configuration for determining the crosslink interference.

The crosslink interference monitor 715 may measure crosslink interference in accordance with at least one of a set of tracking loops, the set of tracking loops including the dedicated tracking loop of the interference tracking configuration.

In some examples, the crosslink interference monitor 715 may measure the crosslink interference based on the first reference signal.

The measurement feedback component 720 may transmit, to a base station, measurement feedback based on the measuring of the crosslink interference.

In some examples, the measurement feedback component 720 may transmit the tracking loop indicator with the measurement feedback.

The tracking activation component 725 may receive an activation message that triggers the use of the dedicated tracking loop.

The dedicated tracking loop controller 730 may measure the dedicated channel in accordance with the activation message and the configuration message.

In some examples, the dedicated tracking loop controller 730 may transmit, to the base station, a tracking loop indicator that indicates whether the measurement feedback is in accordance with the dedicated tracking loop.

In some examples, the dedicated tracking loop controller 730 may transmit the tracking loop indicator with UE capability information regarding a capability of the UE for crosslink interference tracking.

The crosslink interference association controller 735 may receive, from the base station, an association indication pertaining to an aggressor UE which is a source of the crosslink interference measured by the UE.

In some examples, the crosslink interference association controller 735 may receive the association indication in downlink control information, a medium access control-control element, or a radio resource configuration.

The association manager 740 may receive, from the aggressor UE, a first interfering transmission and a second interfering transmission.

The interference estimation component 745 may estimate the crosslink interference arising from the first interfering transmission and the second interfering transmission together based on the association indication.

In some examples, the interference estimation component 745 may estimate the crosslink interference arising from the first interfering transmission and the second interfering transmission together based on the identifier of the aggressor UE being present in both the first interfering transmission and the second interfering transmission.

The QCL manager 750 may receive a dummy parameter indicating a type of quasi co-location of the first interfering transmission and the second interfering transmission.

In some cases, the association indication indicates a resource pattern for the first interfering transmission and the second interfering transmission and indicates that the first interfering transmission and the second interfering transmission are quasi co-located.

In some cases, the resource pattern indicates whether one or both of the first interfering transmission and the second interfering transmission include a received signal strength indicator resource or a reference signal.

The aggressor identifier 755 may receive an identifier of the aggressor UE in the first interfering transmission and in the second interfering transmission.

In some cases, the association indication indicates use of a UE identifier, a cell identifier, or both to identify the aggressor UE.

In some cases, the UE identifier is based on an international mobile subscriber identity and a paging occasion index, a UE-specific radio network temporary identifier and the cell identifier, a device-to-device identity, a mobile subscriber identification number, or a combination thereof.

The reference signal manager 760 may receive, from an aggressor UE which is a source of the crosslink interference measured by the UE, a first reference signal earlier in a subframe than symbols in which a sounding reference signal is received.

In some examples, the reference signal manager 760 may receive downlink control information indicating a dynamic reference signal configuration, where receiving the first reference signal is based on the dynamic reference signal configuration.

In some cases, the first reference signal is a demodulation reference signal or a phase tracking reference signal.

Figure 8:
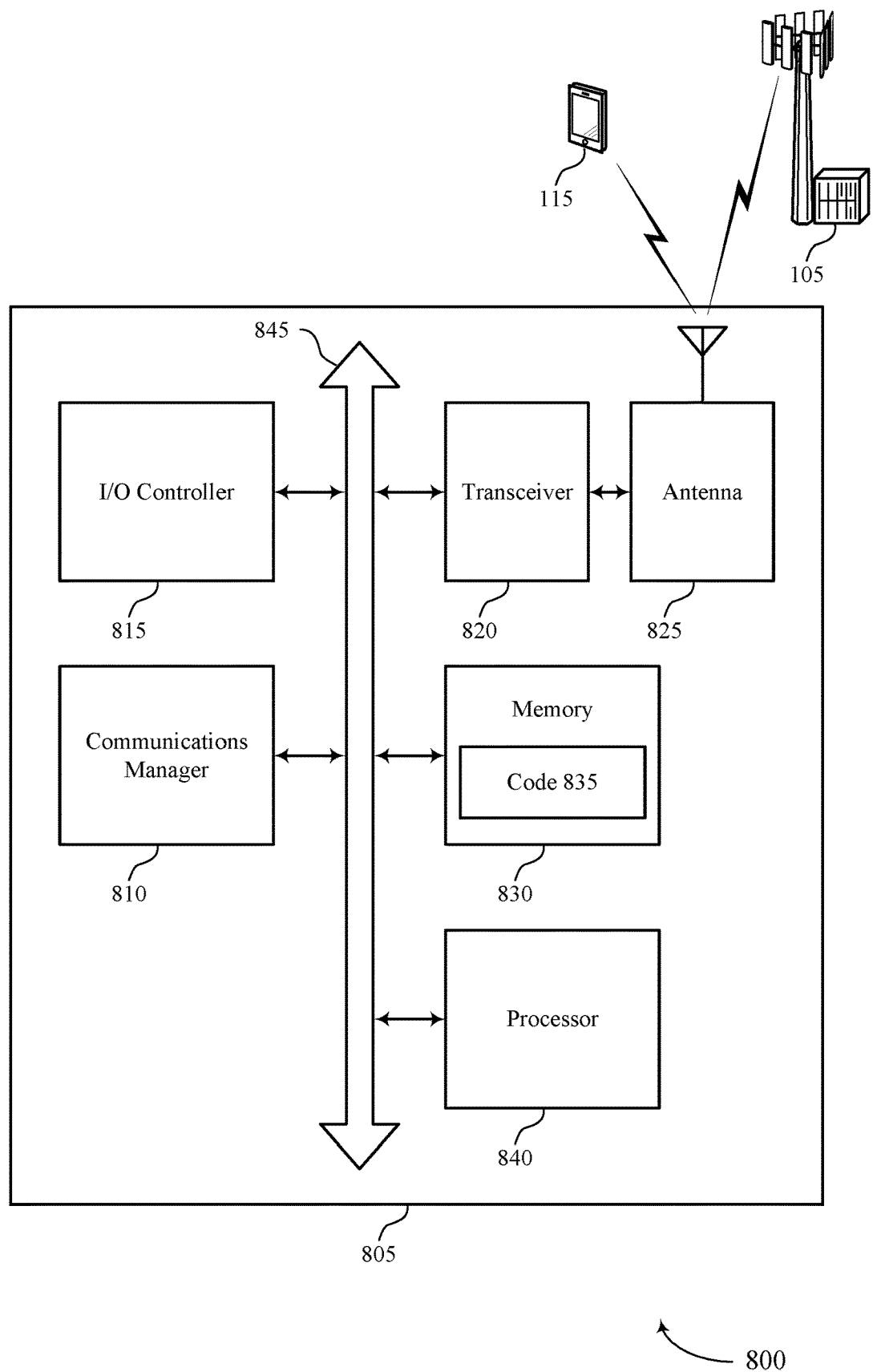
FIG. 8 shows a diagram of a system including a device that supports resource configuration for cross link interference measurement in accordance with aspects of the present disclosure.

FIG. 8 shows a diagram of a system 800 including a device 805 that supports resource configuration for cross link interference measurement in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify an interference tracking configuration including a dedicated tracking loop for determining crosslink interference using a dedicated channel, measure crosslink interference in accordance with at least one of a set of tracking loops, the set of tracking loops including the dedicated tracking loop of the interference tracking configuration, and transmit, to a base station, measurement feedback based on the measuring of the crosslink interference.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource configuration for cross link interference measurement).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
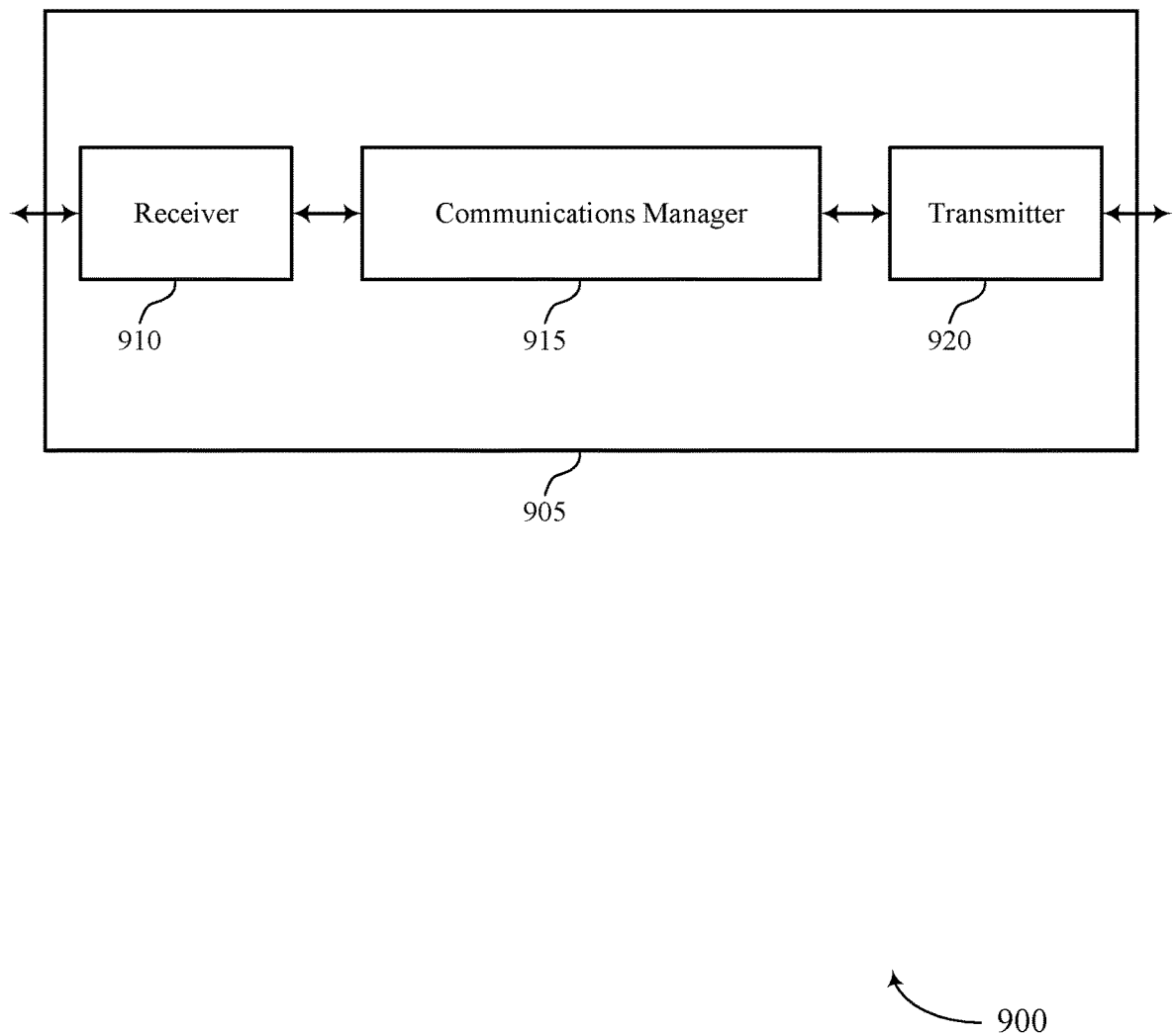
FIGS. 9 and 10 show block diagrams of devices that support resource configuration for cross link interference measurement in accordance with aspects of the present disclosure.

FIG. 9 shows a block diagram 900 of a device 905 that supports resource configuration for cross link interference measurement in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource configuration for cross link interference measurement, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, an interference tracking configuration including a dedicated tracking loop for determining crosslink interference, at the UE, using a dedicated channel and receive, from the UE, measurement feedback based on the interference tracking configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
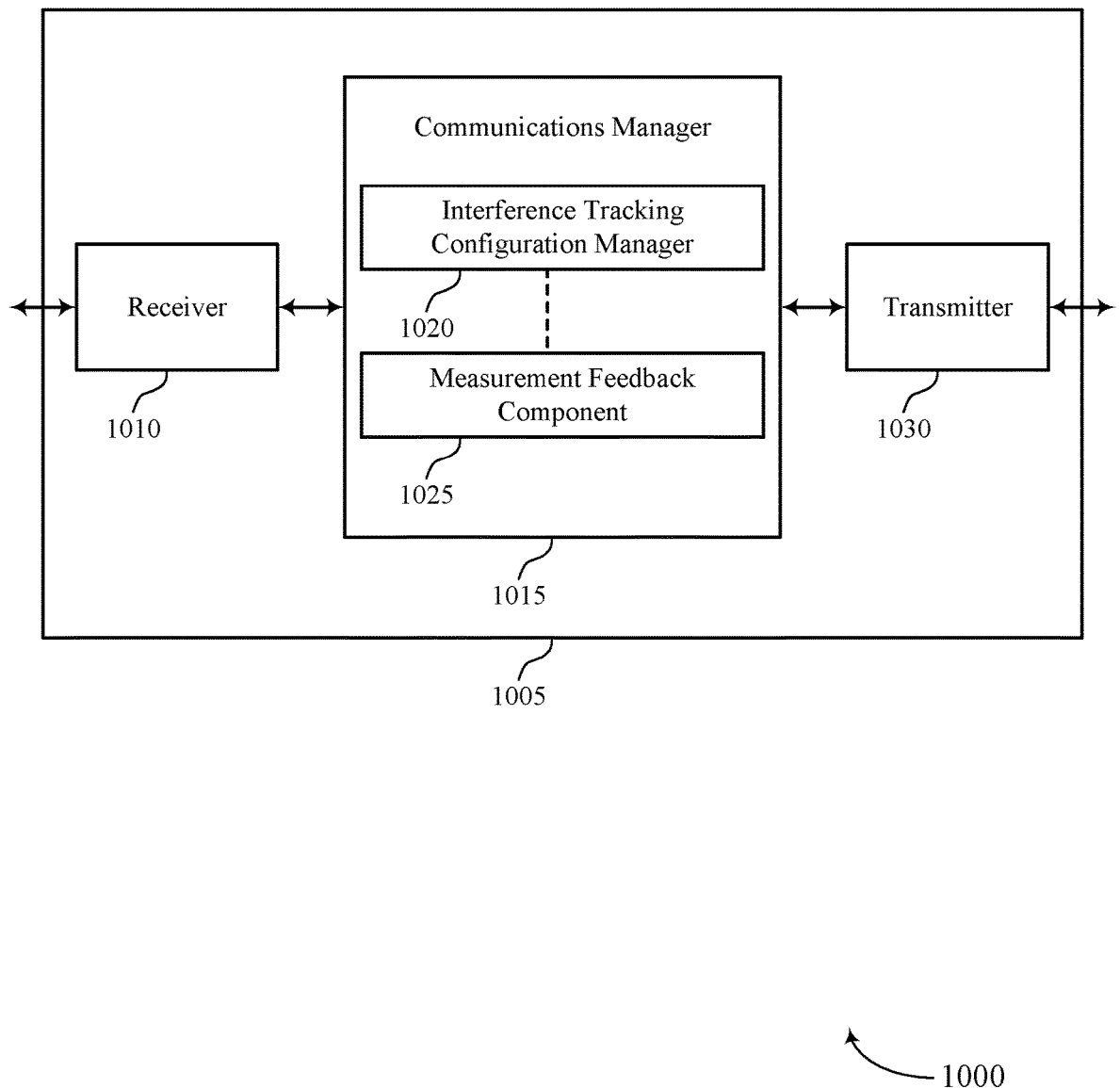

FIG. 10 shows a block diagram 1000 of a device 1005 that supports resource configuration for cross link interference measurement in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to resource configuration for cross link interference measurement, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an interference tracking configuration manager 1020 and a measurement feedback component 1025. The communications manager 1015 may be an example of aspects of the communications manager 1210 described herein.

The interference tracking configuration manager 1020 may transmit, to a UE, an interference tracking configuration including a dedicated tracking loop for determining crosslink interference, at the UE, using a dedicated channel.

The measurement feedback component 1025 may receive, from the UE, measurement feedback based on the interference tracking configuration.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
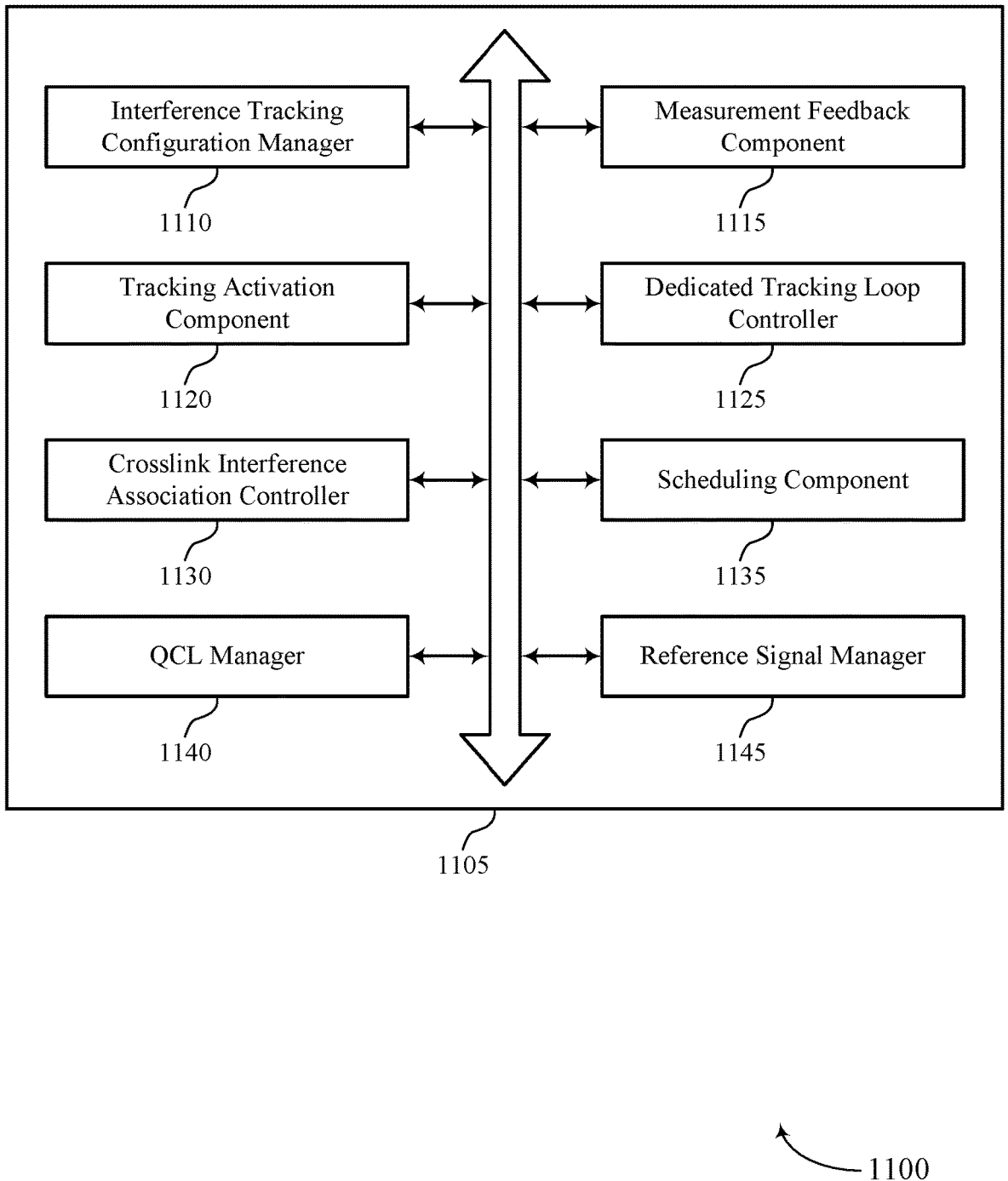
FIG. 11 shows a block diagram of a communications manager that supports resource configuration for cross link interference measurement in accordance with aspects of the present disclosure.

FIG. 11 shows a block diagram 1100 of a communications manager 1105 that supports resource configuration for cross link interference measurement in accordance with aspects of the present disclosure. The communications manager 1105 may be an example of aspects of a communications manager 915, a communications manager 1015, or a communications manager 1210 described herein. The communications manager 1105 may include an interference tracking configuration manager 1110, a measurement feedback component 1115, a tracking activation component 1120, a dedicated tracking loop controller 1125, a crosslink interference association controller 1130, a scheduling component 1135, a QCL manager 1140, and a reference signal manager 1145. Each of these modules may communicate, directly or indirectly, with one another (e.g., via one or more buses).

The interference tracking configuration manager 1110 may transmit, to a UE, an interference tracking configuration including a dedicated tracking loop for determining crosslink interference, at the UE, using a dedicated channel.

In some examples, the interference tracking configuration manager 1110 may transmit the interference tracking configuration via a configuration message.

In some cases, the interference tracking configuration is a default configuration for determining the crosslink interference.

The measurement feedback component 1115 may receive, from the UE, measurement feedback based on the interference tracking configuration.

In some examples, the measurement feedback component 1115 may receive, from the UE, the measurement feedback in accordance with the activation message and the configuration message.

In some examples, the measurement feedback component 1115 may receive the tracking loop indicator with the measurement feedback.

The tracking activation component 1120 may transmit an activation message that triggers the use of the dedicated tracking loop.

In some examples, the tracking activation component 1120 may transmit the activation message via downlink control information, a medium access control-control entity, or a radio resource control message.

The dedicated tracking loop controller 1125 may receive a tracking loop indicator that indicates whether the measurement feedback is in accordance with the dedicated tracking loop.

In some examples, the dedicated tracking loop controller 1125 may receive the tracking loop indicator with UE capability information regarding a capability of the UE for crosslink interference tracking.

The crosslink interference association controller 1130 may transmit, to the UE, an association indication pertaining to an aggressor UE which is a source of the crosslink interference measured by the UE.

In some examples, the crosslink interference association controller 1130 may transmit the association indication in downlink control information, a medium access control-control element, or a radio resource configuration.

In some cases, the association indication indicates a resource pattern for the first interfering transmission and the second interfering transmission and indicates that the first interfering transmission and the second interfering transmission are quasi co-located.

In some cases, the resource pattern indicates whether one or both of the first interfering transmission and the second interfering transmission include a received signal strength indicator resource or a reference signal.

In some cases, the association indication indicates use of a UE identifier, cell identifier, or both to identify the aggressor UE.

In some cases, the UE identifier is based on an international mobile subscriber identity and a paging occasion index, a UE-specific radio network temporary identifier and the cell identifier, a device-to-device identity, a mobile subscriber identification number, or a combination thereof.

The scheduling component 1135 may transmit, to the aggressor UE, control information scheduling a first interfering transmission and a second interfering transmission.

In some examples, the scheduling component 1135 may transmit, to an aggressor UE which is a source of the crosslink interference measured by the UE, control information scheduling a first reference signal earlier in a subframe than symbols in which a sounding reference signal is scheduled.

The QCL manager 1140 may transmit a dummy parameter indicating a type of quasi co-location of the first interfering transmission and the second interfering transmission.

The reference signal manager 1145 may transmit downlink control information indicating a dynamic reference signal configuration, where transmitting the first reference signal is based on the dynamic reference signal configuration.

In some cases, the first reference signal is a demodulation reference signal or a phase tracking reference signal.

Figure 12:
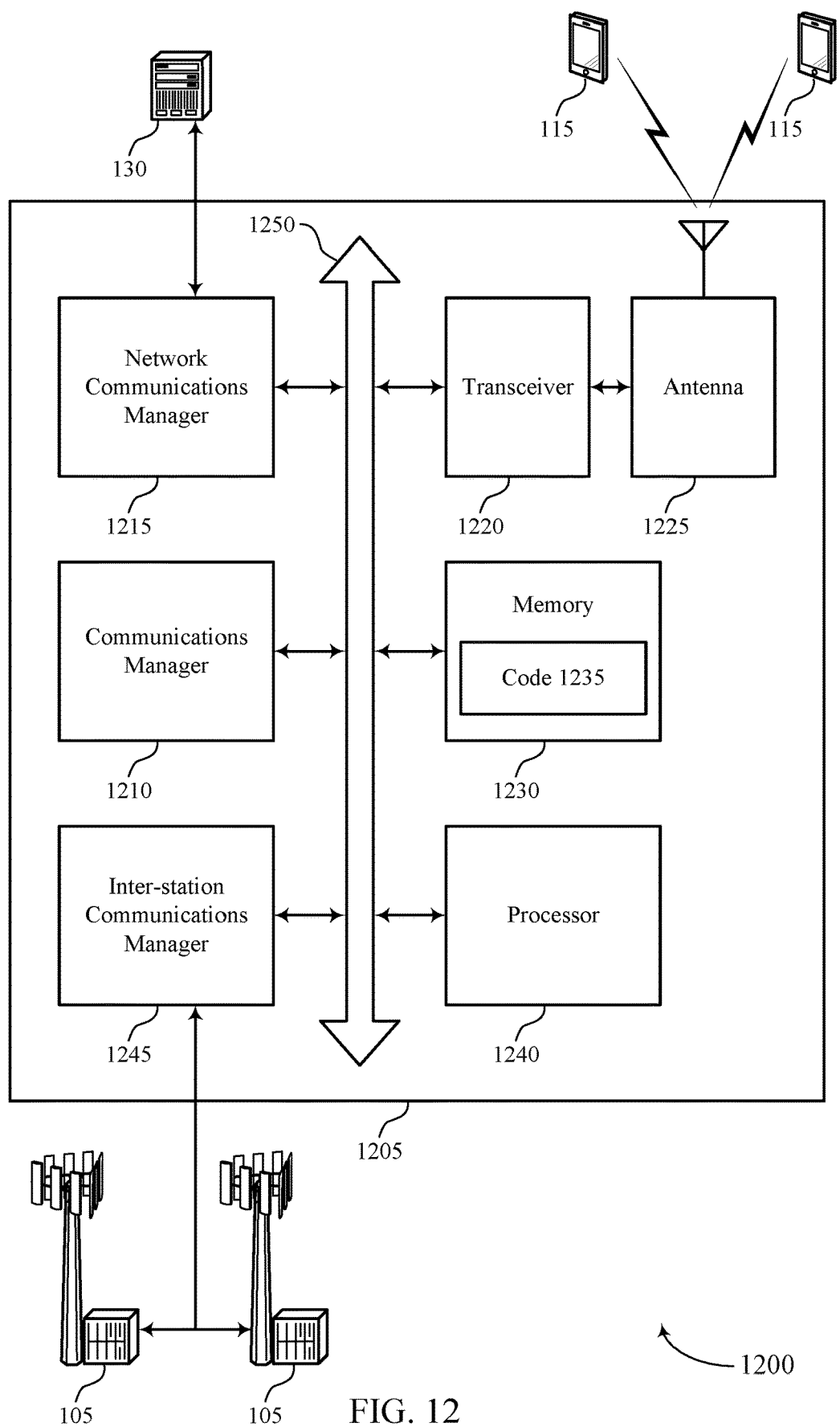
FIG. 12 shows a diagram of a system including a device that supports resource configuration for cross link interference measurement in accordance with aspects of the present disclosure.

FIG. 12 shows a diagram of a system 1200 including a device 1205 that supports resource configuration for cross link interference measurement in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, an interference tracking configuration including a dedicated tracking loop for determining crosslink interference, at the UE, using a dedicated channel and receive, from the UE, measurement feedback based on the interference tracking configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting resource configuration for cross link interference measurement).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
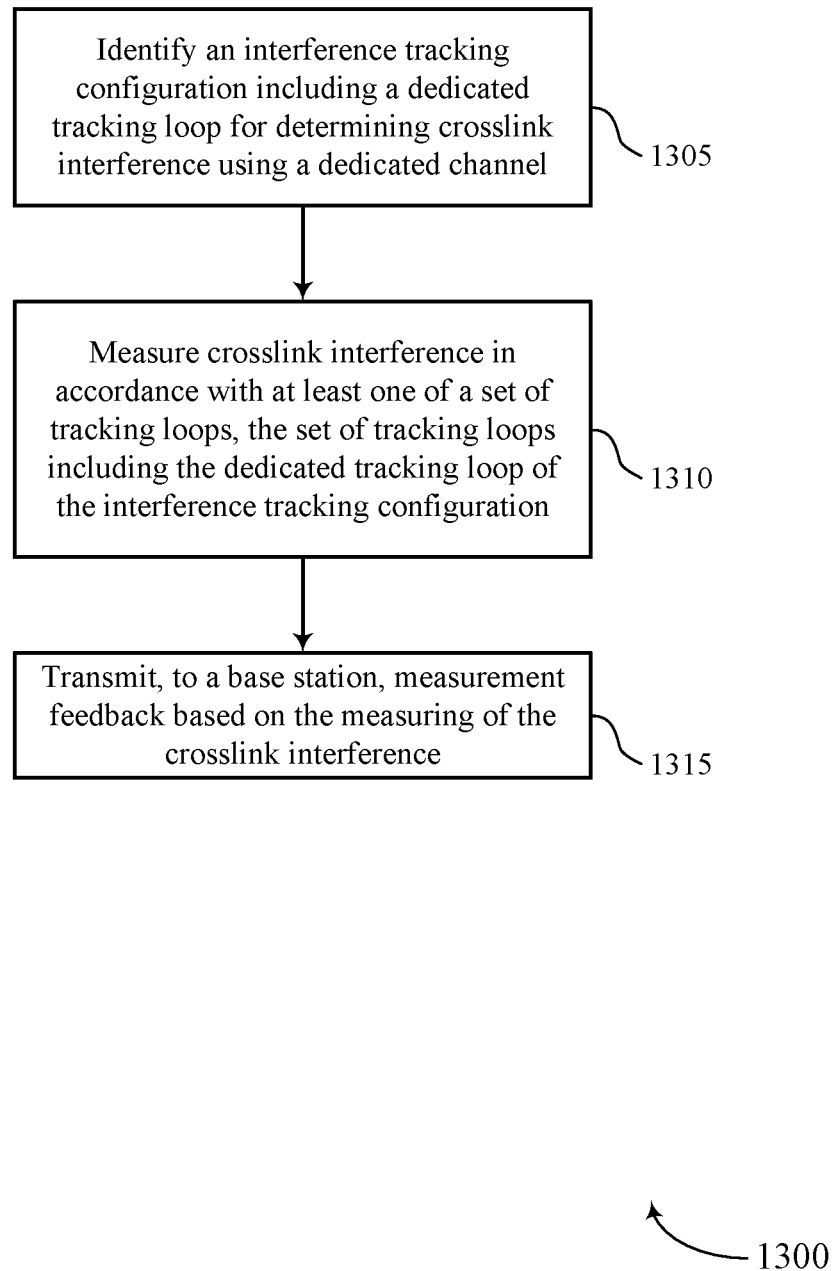
FIGS. 13 through 22 show flowcharts illustrating methods that support resource configuration for cross link interference measurement in accordance with aspects of the present disclosure.

FIG. 13 shows a flowchart illustrating a method 1300 that supports resource configuration for cross link interference measurement in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify an interference tracking configuration including a dedicated tracking loop for determining crosslink interference using a dedicated channel. The operations of 1305 may be performed according to the methods described herein. In some examples, aspects of the operations of 1305 may be performed by an interference tracking configuration manager as described with reference to FIGS. 5 through 8.

At 1310, the UE may measure crosslink interference in accordance with at least one of a set of tracking loops, the set of tracking loops including the dedicated tracking loop of the interference tracking configuration. The operations of 1310 may be performed according to the methods described herein. In some examples, aspects of the operations of 1310 may be performed by a crosslink interference monitor as described with reference to FIGS. 5 through 8.

At 1315, the UE may transmit, to a base station, measurement feedback based on the measuring of the crosslink interference. The operations of 1315 may be performed according to the methods described herein. In some examples, aspects of the operations of 1315 may be performed by a measurement feedback component as described with reference to FIGS. 5 through 8.

Figure 14:
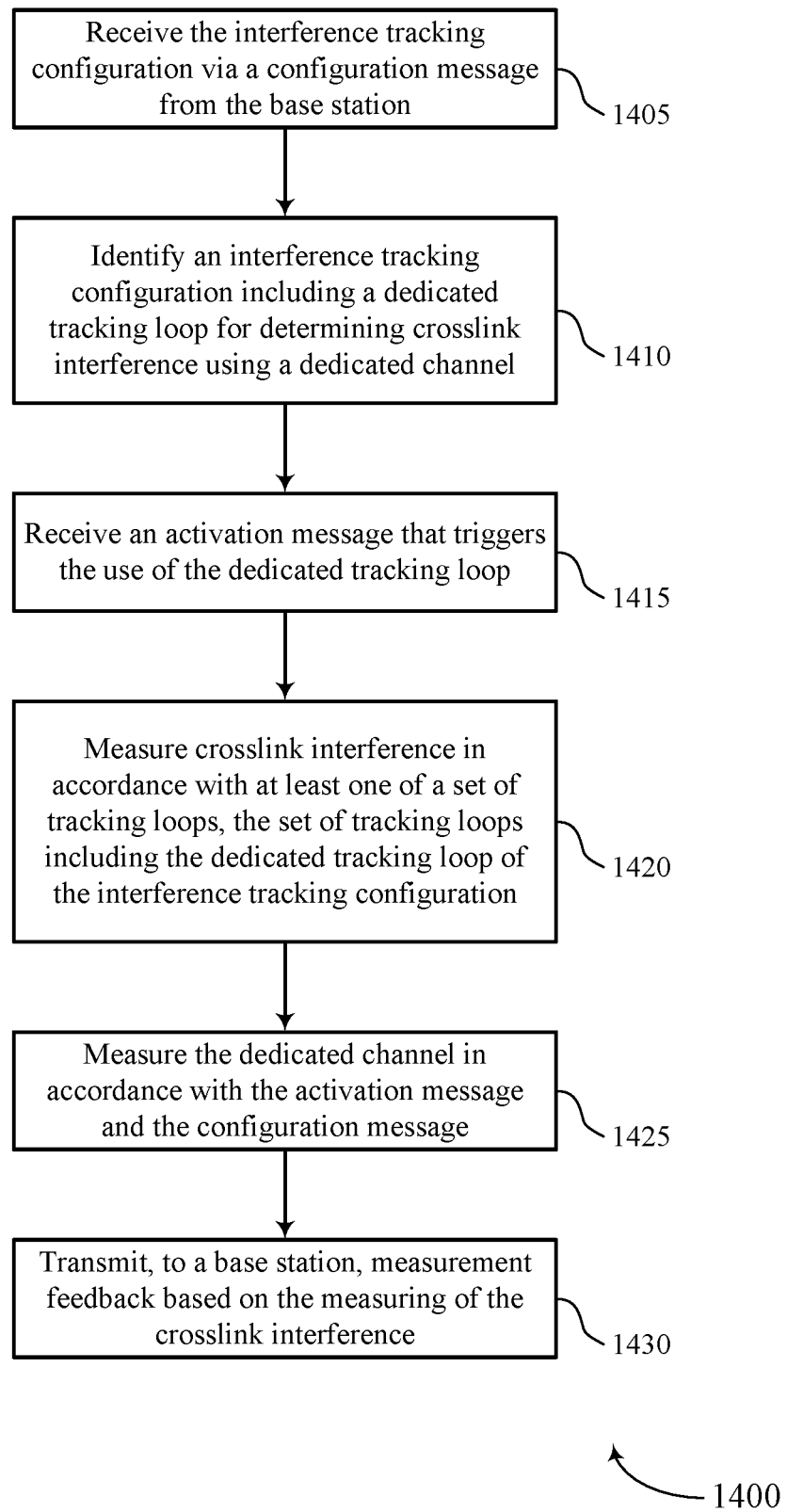

FIG. 14 shows a flowchart illustrating a method 1400 that supports resource configuration for cross link interference measurement in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive the interference tracking configuration via a configuration message from the base station. The operations of 1405 may be performed according to the methods described herein. In some examples, aspects of the operations of 1405 may be performed by an interference tracking configuration manager as described with reference to FIGS. 5 through 8.

At 1410, the UE may identify an interference tracking configuration including a dedicated tracking loop for determining crosslink interference using a dedicated channel. The operations of 1410 may be performed according to the methods described herein. In some examples, aspects of the operations of 1410 may be performed by an interference tracking configuration manager as described with reference to FIGS. 5 through 8.

At 1415, the UE may receive an activation message that triggers the use of the dedicated tracking loop. The operations of 1415 may be performed according to the methods described herein. In some examples, aspects of the operations of 1415 may be performed by a tracking activation component as described with reference to FIGS. 5 through 8.

At 1420, the UE may measure crosslink interference in accordance with at least one of a set of tracking loops, the set of tracking loops including the dedicated tracking loop of the interference tracking configuration. The operations of 1420 may be performed according to the methods described herein. In some examples, aspects of the operations of 1420 may be performed by a crosslink interference monitor as described with reference to FIGS. 5 through 8.

At 1425, the UE may measure the dedicated channel in accordance with the activation message and the configuration message. The operations of 1425 may be performed according to the methods described herein. In some examples, aspects of the operations of 1425 may be performed by a dedicated tracking loop controller as described with reference to FIGS. 5 through 8.

At 1430, the UE may transmit, to a base station, measurement feedback based on the measuring of the crosslink interference. The operations of 1430 may be performed according to the methods described herein. In some examples, aspects of the operations of 1430 may be performed by a measurement feedback component as described with reference to FIGS. 5 through 8.

Figure 15:
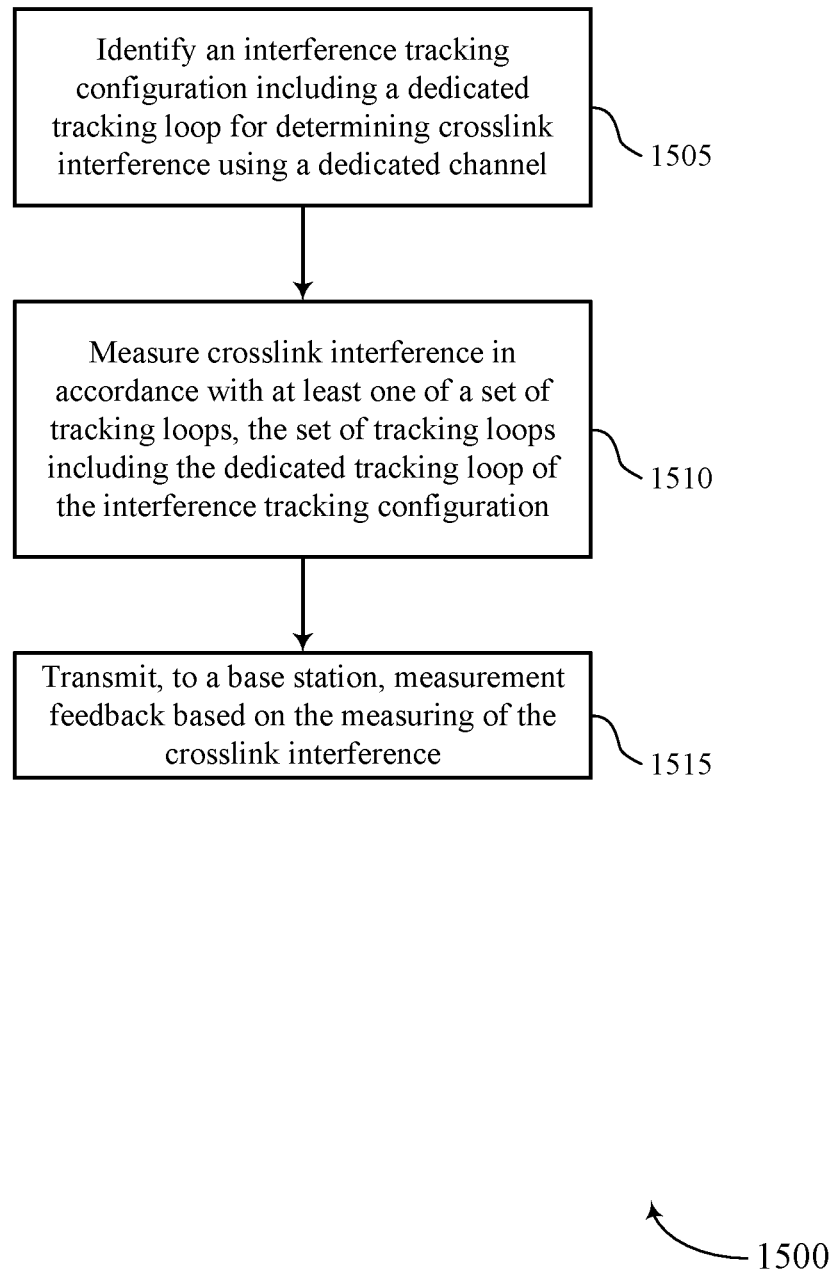

FIG. 15 shows a flowchart illustrating a method 1500 that supports resource configuration for cross link interference measurement in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify an interference tracking configuration including a dedicated tracking loop for determining crosslink interference using a dedicated channel. The operations of 1505 may be performed according to the methods described herein. In some examples, aspects of the operations of 1505 may be performed by an interference tracking configuration manager as described with reference to FIGS. 5 through 8.

At 1510, the UE may measure crosslink interference in accordance with at least one of a set of tracking loops, the set of tracking loops including the dedicated tracking loop of the interference tracking configuration. The operations of 1510 may be performed according to the methods described herein. In some examples, aspects of the operations of 1510 may be performed by a crosslink interference monitor as described with reference to FIGS. 5 through 8.

At 1515, the UE may transmit, to a base station, measurement feedback based on the measuring of the crosslink interference. The operations of 1515 may be performed according to the methods described herein. In some examples, aspects of the operations of 1515 may be performed by a measurement feedback component as described with reference to FIGS. 5 through 8.

Figure 16:
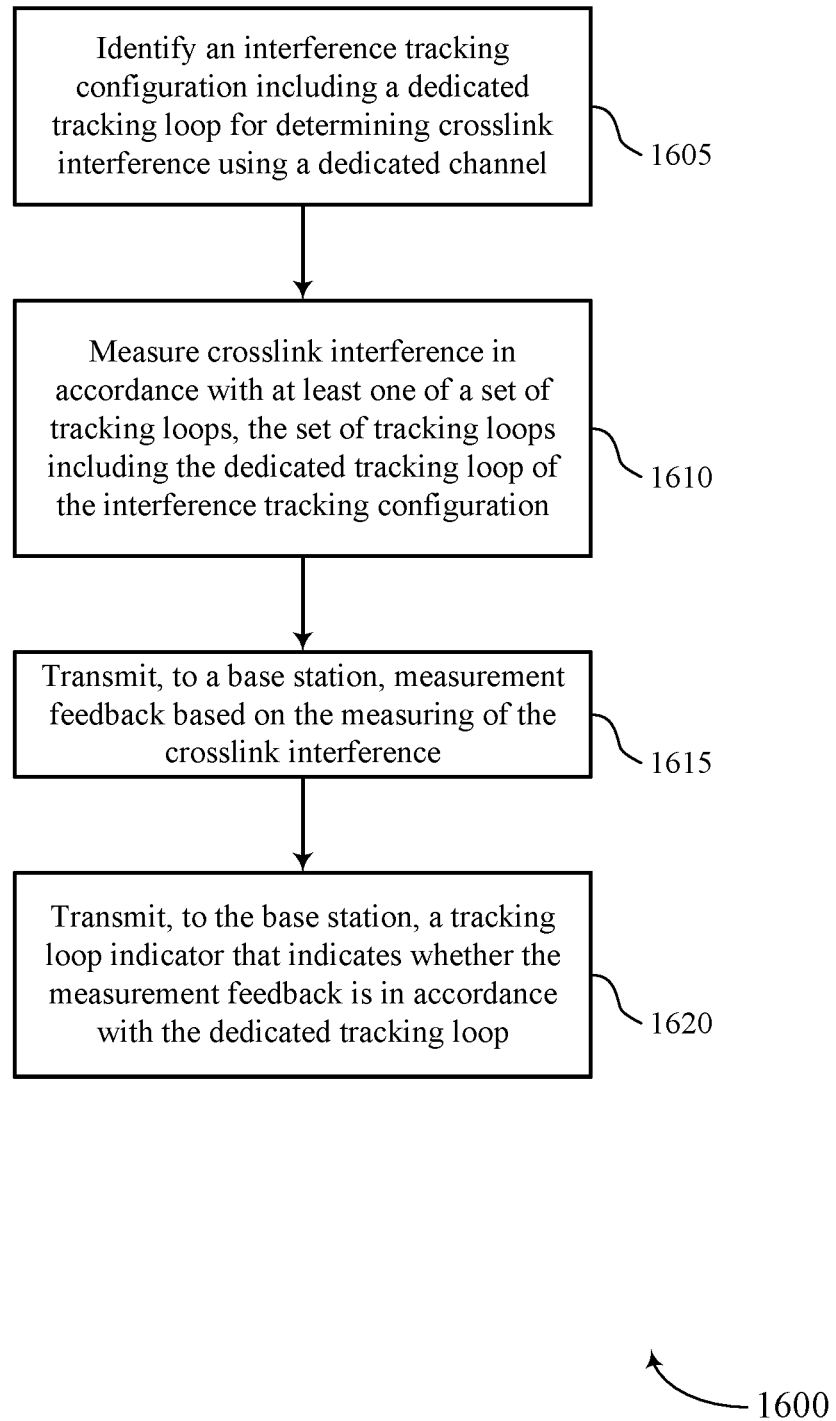

FIG. 16 shows a flowchart illustrating a method 1600 that supports resource configuration for cross link interference measurement in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify an interference tracking configuration including a dedicated tracking loop for determining crosslink interference using a dedicated channel. The operations of 1605 may be performed according to the methods described herein. In some examples, aspects of the operations of 1605 may be performed by an interference tracking configuration manager as described with reference to FIGS. 5 through 8.

At 1610, the UE may measure crosslink interference in accordance with at least one of a set of tracking loops, the set of tracking loops including the dedicated tracking loop of the interference tracking configuration. The operations of 1610 may be performed according to the methods described herein. In some examples, aspects of the operations of 1610 may be performed by a crosslink interference monitor as described with reference to FIGS. 5 through 8.

At 1615, the UE may transmit, to a base station, measurement feedback based on the measuring of the crosslink interference. The operations of 1615 may be performed according to the methods described herein. In some examples, aspects of the operations of 1615 may be performed by a measurement feedback component as described with reference to FIGS. 5 through 8.

At 1620, the UE may transmit, to the base station, a tracking loop indicator that indicates whether the measurement feedback is in accordance with the dedicated tracking loop. The operations of 1620 may be performed according to the methods described herein. In some examples, aspects of the operations of 1620 may be performed by a dedicated tracking loop controller as described with reference to FIGS. 5 through 8.

Figure 17:
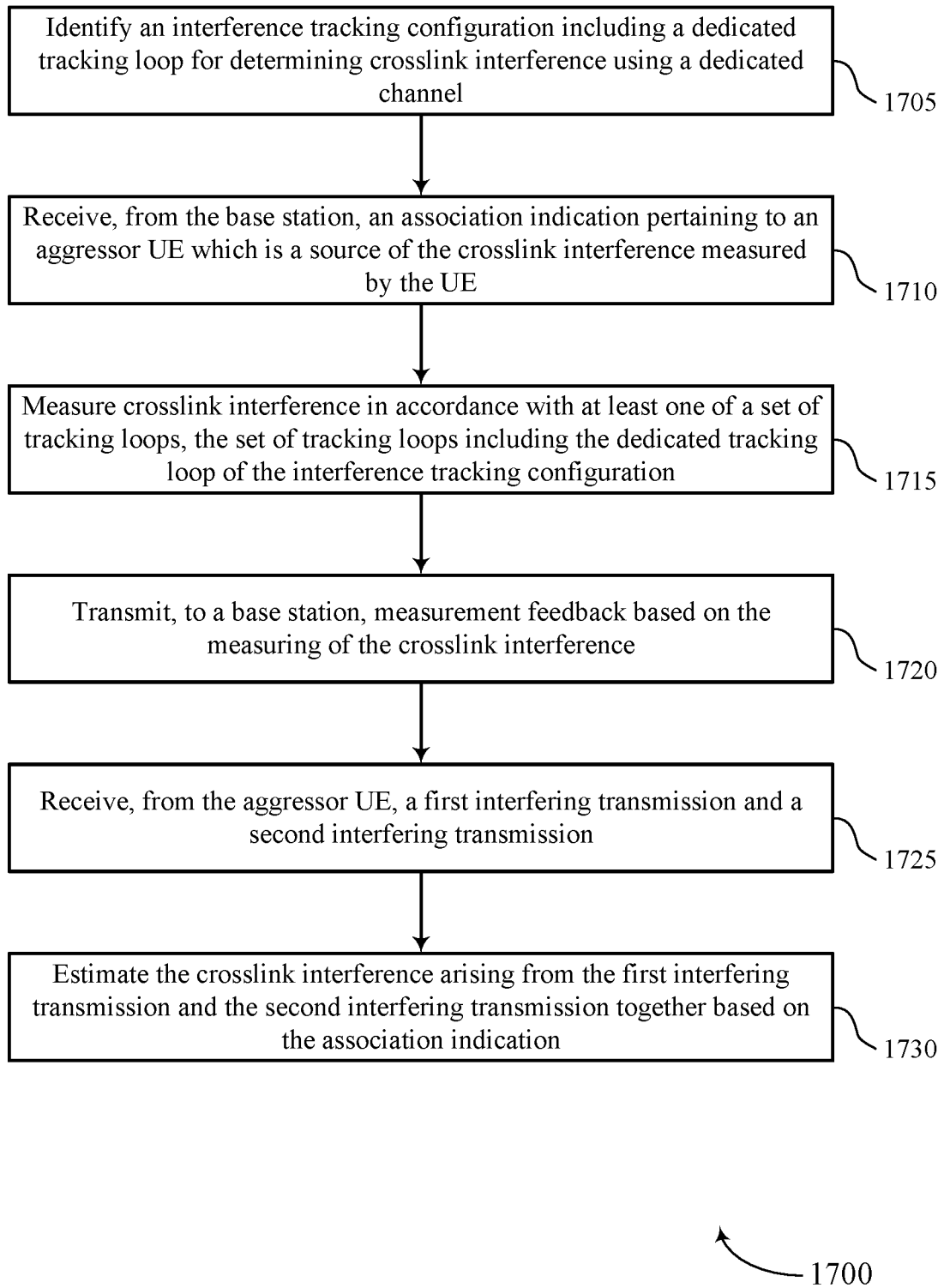

FIG. 17 shows a flowchart illustrating a method 1700 that supports resource configuration for cross link interference measurement in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may identify an interference tracking configuration including a dedicated tracking loop for determining crosslink interference using a dedicated channel. The operations of 1705 may be performed according to the methods described herein. In some examples, aspects of the operations of 1705 may be performed by an interference tracking configuration manager as described with reference to FIGS. 5 through 8.

At 1710, the UE may receive, from the base station, an association indication pertaining to an aggressor UE which is a source of the crosslink interference measured by the UE. The operations of 1710 may be performed according to the methods described herein. In some examples, aspects of the operations of 1710 may be performed by a crosslink interference association controller as described with reference to FIGS. 5 through 8.

At 1715, the UE may measure crosslink interference in accordance with at least one of a set of tracking loops, the set of tracking loops including the dedicated tracking loop of the interference tracking configuration. The operations of 1715 may be performed according to the methods described herein. In some examples, aspects of the operations of 1715 may be performed by a crosslink interference monitor as described with reference to FIGS. 5 through 8.

At 1720, the UE may transmit, to a base station, measurement feedback based on the measuring of the crosslink interference. The operations of 1720 may be performed according to the methods described herein. In some examples, aspects of the operations of 1720 may be performed by a measurement feedback component as described with reference to FIGS. 5 through 8.

At 1725, the UE may receive, from the aggressor UE, a first interfering transmission and a second interfering transmission. The operations of 1725 may be performed according to the methods described herein. In some examples, aspects of the operations of 1725 may be performed by an association manager as described with reference to FIGS. 5 through 8.

At 1730, the UE may estimate the crosslink interference arising from the first interfering transmission and the second interfering transmission together based on the association indication. The operations of 1730 may be performed according to the methods described herein. In some examples, aspects of the operations of 1730 may be performed by an interference estimation component as described with reference to FIGS. 5 through 8.

Figure 18:
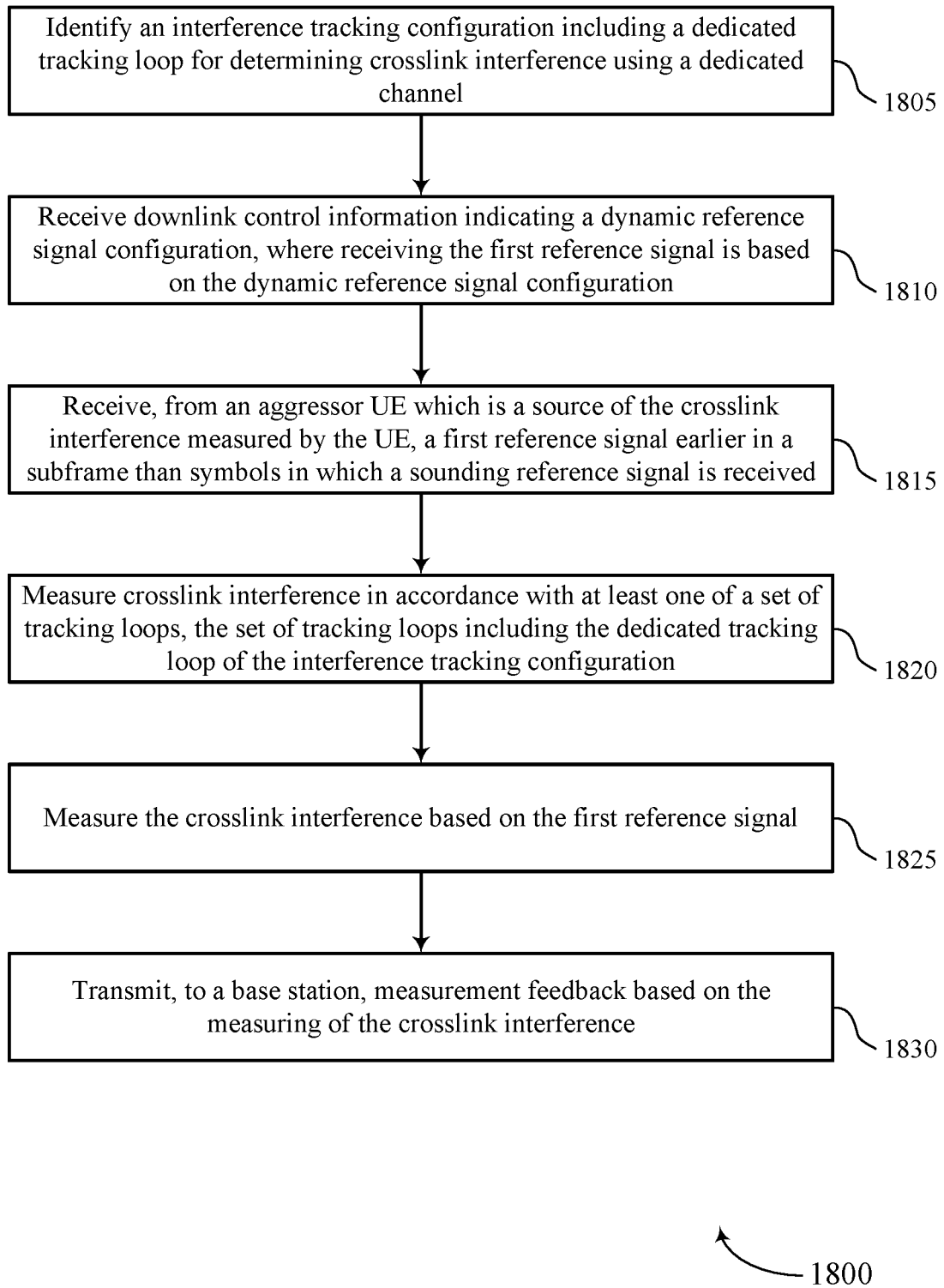

FIG. 18 shows a flowchart illustrating a method 1800 that supports resource configuration for cross link interference measurement in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may identify an interference tracking configuration including a dedicated tracking loop for determining crosslink interference using a dedicated channel. The operations of 1805 may be performed according to the methods described herein. In some examples, aspects of the operations of 1805 may be performed by an interference tracking configuration manager as described with reference to FIGS. 5 through 8.

At 1810, the UE may receive downlink control information indicating a dynamic reference signal configuration, where receiving the first reference signal is based on the dynamic reference signal configuration. The operations of 1810 may be performed according to the methods described herein. In some examples, aspects of the operations of 1810 may be performed by a reference signal manager as described with reference to FIGS. 5 through 8.

At 1815, the UE may receive, from an aggressor UE which is a source of the crosslink interference measured by the UE, a first reference signal earlier in a subframe than symbols in which a sounding reference signal is received. The operations of 1815 may be performed according to the methods described herein. In some examples, aspects of the operations of 1815 may be performed by a reference signal manager as described with reference to FIGS. 5 through 8.

At 1820, the UE may measure crosslink interference in accordance with at least one of a set of tracking loops, the set of tracking loops including the dedicated tracking loop of the interference tracking configuration. The operations of 1820 may be performed according to the methods described herein. In some examples, aspects of the operations of 1820 may be performed by a crosslink interference monitor as described with reference to FIGS. 5 through 8.

At 1825, the UE may measure the crosslink interference based on the first reference signal. The operations of 1825 may be performed according to the methods described herein. In some examples, aspects of the operations of 1825 may be performed by a crosslink interference monitor as described with reference to FIGS. 5 through 8.

At 1830, the UE may transmit, to a base station, measurement feedback based on the measuring of the crosslink interference. The operations of 1830 may be performed according to the methods described herein. In some examples, aspects of the operations of 1830 may be performed by a measurement feedback component as described with reference to FIGS. 5 through 8.

Figure 19:
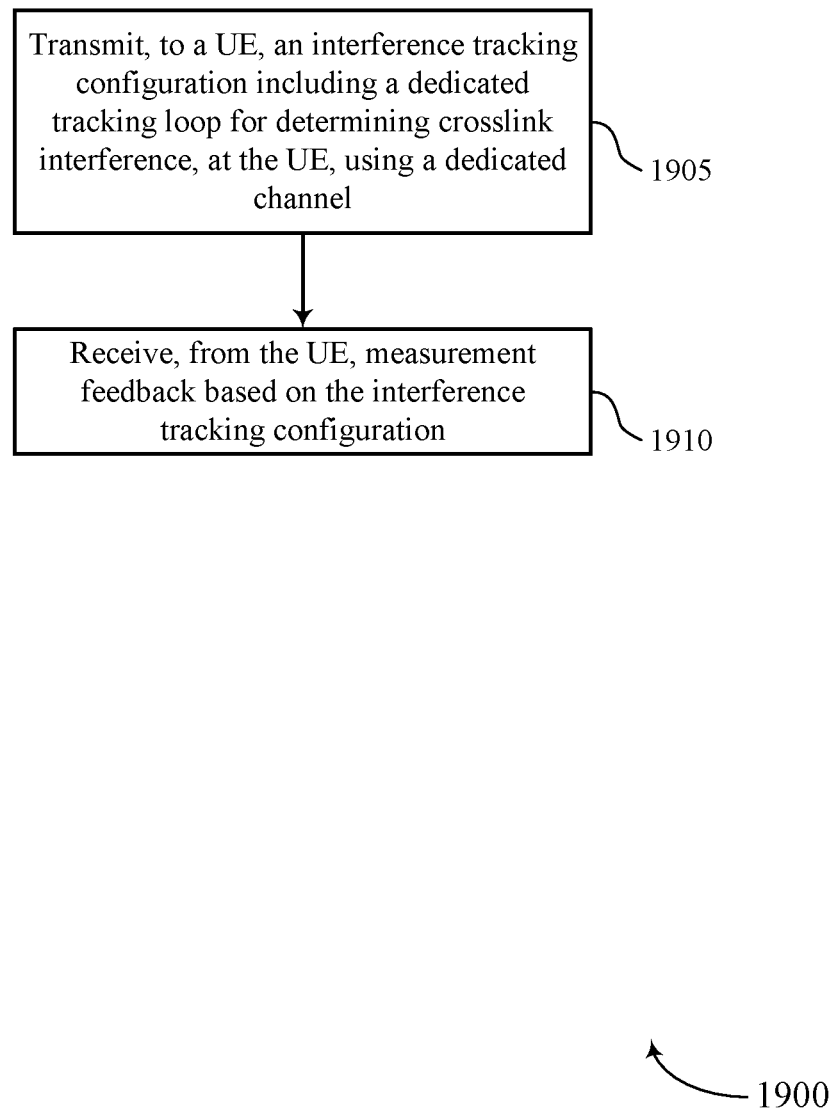

FIG. 19 shows a flowchart illustrating a method 1900 that supports resource configuration for cross link interference measurement in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, an interference tracking configuration including a dedicated tracking loop for determining crosslink interference, at the UE, using a dedicated channel. The operations of 1905 may be performed according to the methods described herein. In some examples, aspects of the operations of 1905 may be performed by an interference tracking configuration manager as described with reference to FIGS. 9 through 12.

At 1910, the base station may receive, from the UE, measurement feedback based on the interference tracking configuration. The operations of 1910 may be performed according to the methods described herein. In some examples, aspects of the operations of 1910 may be performed by a measurement feedback component as described with reference to FIGS. 9 through 12.

Figure 20:
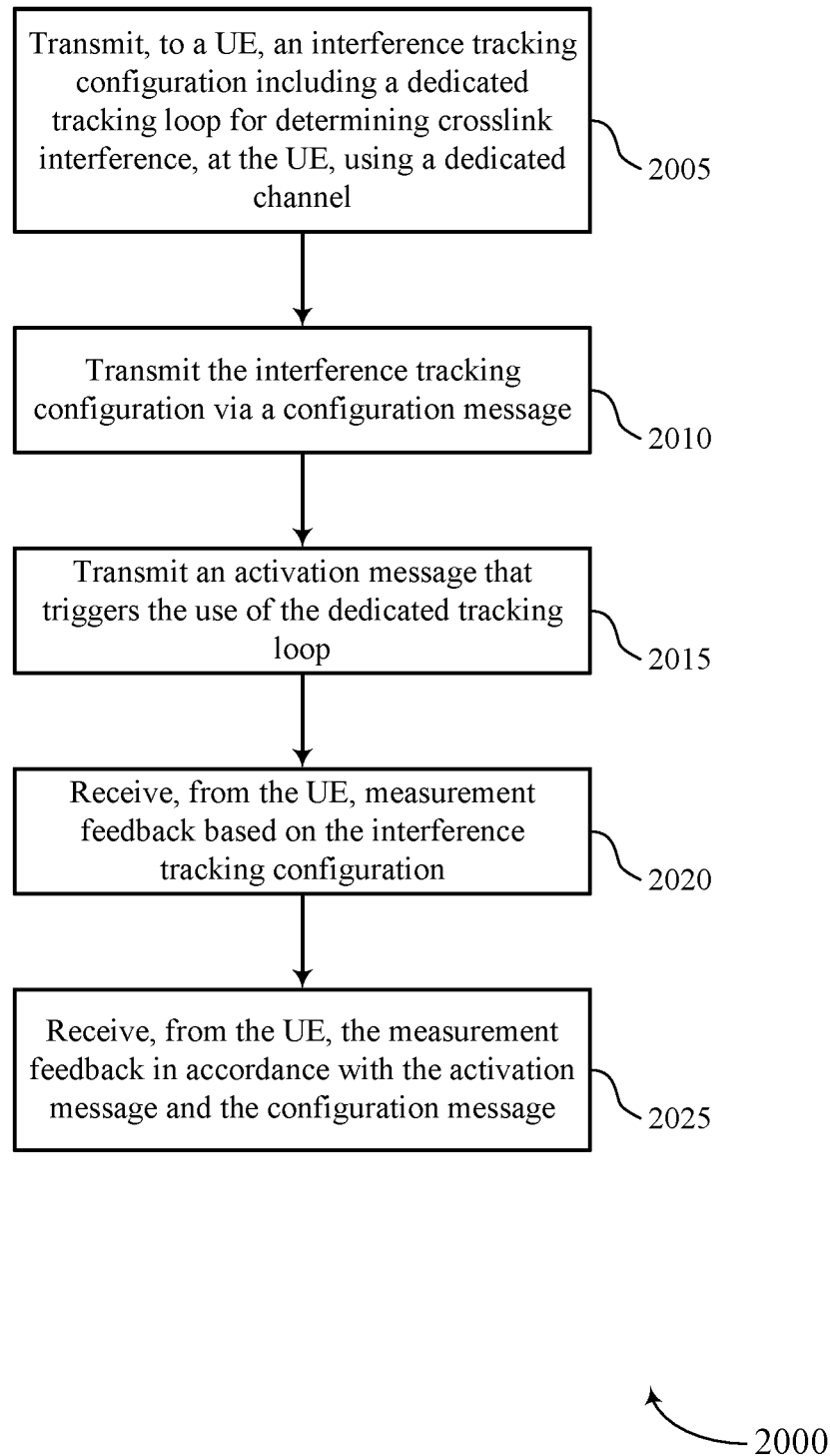

FIG. 20 shows a flowchart illustrating a method 2000 that supports resource configuration for cross link interference measurement in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, an interference tracking configuration including a dedicated tracking loop for determining crosslink interference, at the UE, using a dedicated channel. The operations of 2005 may be performed according to the methods described herein. In some examples, aspects of the operations of 2005 may be performed by an interference tracking configuration manager as described with reference to FIGS. 9 through 12.

At 2010, the base station may transmit the interference tracking configuration via a configuration message. The operations of 2010 may be performed according to the methods described herein. In some examples, aspects of the operations of 2010 may be performed by an interference tracking configuration manager as described with reference to FIGS. 9 through 12.

At 2015, the base station may transmit an activation message that triggers the use of the dedicated tracking loop. The operations of 2015 may be performed according to the methods described herein. In some examples, aspects of the operations of 2015 may be performed by a tracking activation component as described with reference to FIGS. 9 through 12.

At 2020, the base station may receive, from the UE, measurement feedback based on the interference tracking configuration. The operations of 2020 may be performed according to the methods described herein. In some examples, aspects of the operations of 2020 may be performed by a measurement feedback component as described with reference to FIGS. 9 through 12.

At 2025, the base station may receive, from the UE, the measurement feedback in accordance with the activation message and the configuration message. The operations of 2025 may be performed according to the methods described herein. In some examples, aspects of the operations of 2025 may be performed by a measurement feedback component as described with reference to FIGS. 9 through 12.

Figure 21:
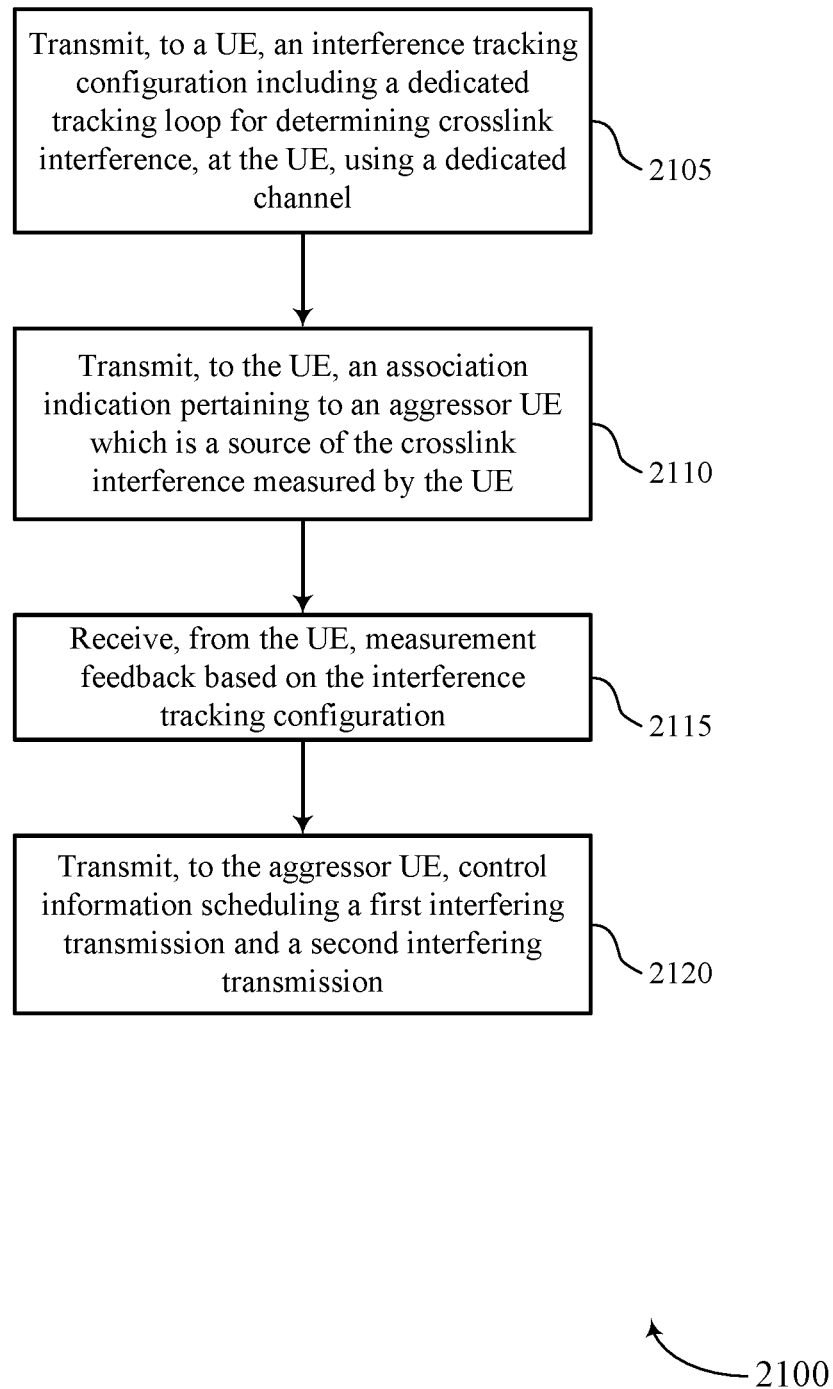

FIG. 21 shows a flowchart illustrating a method 2100 that supports resource configuration for cross link interference measurement in accordance with aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, an interference tracking configuration including a dedicated tracking loop for determining crosslink interference, at the UE, using a dedicated channel. The operations of 2105 may be performed according to the methods described herein. In some examples, aspects of the operations of 2105 may be performed by an interference tracking configuration manager as described with reference to FIGS. 9 through 12.

At 2110, the base station may transmit, to the UE, an association indication pertaining to an aggressor UE which is a source of the crosslink interference measured by the UE. The operations of 2110 may be performed according to the methods described herein. In some examples, aspects of the operations of 2110 may be performed by a crosslink interference association controller as described with reference to FIGS. 9 through 12.

At 2115, the base station may receive, from the UE, measurement feedback based on the interference tracking configuration. The operations of 2115 may be performed according to the methods described herein. In some examples, aspects of the operations of 2115 may be performed by a measurement feedback component as described with reference to FIGS. 9 through 12.

At 2120, the base station may transmit, to the aggressor UE, control information scheduling a first interfering transmission and a second interfering transmission. The operations of 2120 may be performed according to the methods described herein. In some examples, aspects of the operations of 2120 may be performed by a scheduling component as described with reference to FIGS. 9 through 12.

Figure 22:
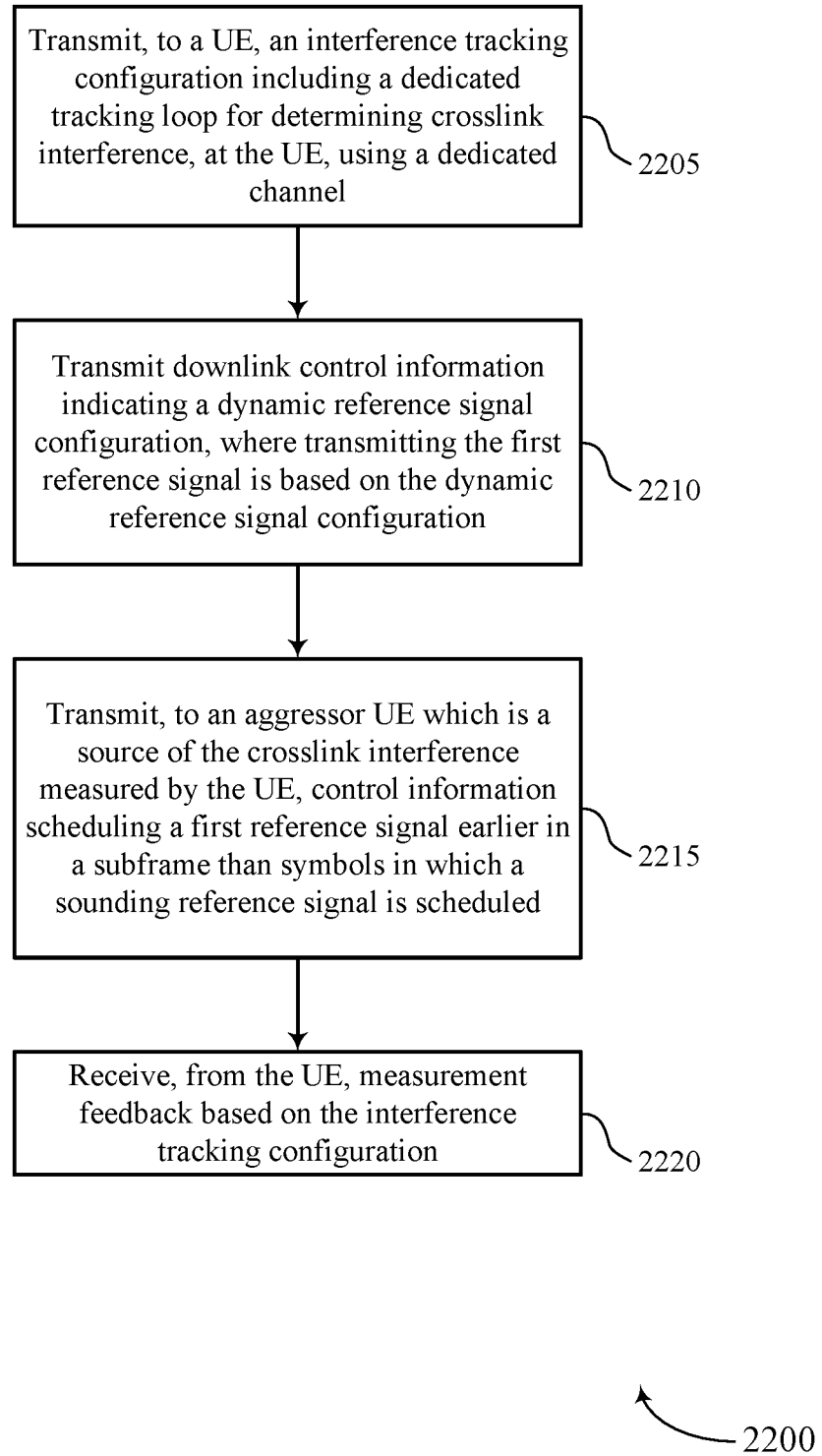

FIG. 22 shows a flowchart illustrating a method 2200 that supports resource configuration for cross link interference measurement in accordance with aspects of the present disclosure. The operations of method 2200 may be implemented by a base station 105 or its components as described herein. For example, the operations of method 2200 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, an interference tracking configuration including a dedicated tracking loop for determining crosslink interference, at the UE, using a dedicated channel. The operations of 2205 may be performed according to the methods described herein. In some examples, aspects of the operations of 2205 may be performed by an interference tracking configuration manager as described with reference to FIGS. 9 through 12.

At 2210, the base station may transmit downlink control information indicating a dynamic reference signal configuration, where transmitting the first reference signal is based on the dynamic reference signal configuration. The operations of 2210 may be performed according to the methods described herein. In some examples, aspects of the operations of 2210 may be performed by a reference signal manager as described with reference to FIGS. 9 through 12.

At 2215, the base station may transmit, to an aggressor UE which is a source of the crosslink interference measured by the UE, control information scheduling a first reference signal earlier in a subframe than symbols in which a sounding reference signal is scheduled. The operations of 2215 may be performed according to the methods described herein. In some examples, aspects of the operations of 2215 may be performed by a scheduling component as described with reference to FIGS. 9 through 12.

At 2220, the base station may receive, from the UE, measurement feedback based on the interference tracking configuration. The operations of 2220 may be performed according to the methods described herein. In some examples, aspects of the operations of 2220 may be performed by a measurement feedback component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying an interference tracking configuration comprising a dedicated tracking loop for determining crosslink interference using a dedicated channel;
   measuring crosslink interference in accordance with at least one of a plurality of tracking loops, the plurality of tracking loops including the dedicated tracking loop of the interference tracking configuration; and
   transmitting, to a base station, measurement feedback based at least in part on the measuring of the crosslink interference.

2. The method of claim 1, further comprising:
   receiving the interference tracking configuration via a configuration message from the base station;
   receiving an activation message that triggers the use of the dedicated tracking loop; and
   measuring the dedicated channel in accordance with the activation message and the configuration message.

3. A method for wireless communications, comprising:
   transmitting, to a UE, an interference tracking configuration comprising a dedicated tracking loop for determining crosslink interference, at the UE, using a dedicated channel; and
   receiving, from the UE, measurement feedback based at least in part on the interference tracking configuration.

4. The method of claim 3, further comprising:
   transmitting the interference tracking configuration via a configuration message;
   transmitting an activation message that triggers the use of the dedicated tracking loop; and
   receiving, from the UE, the measurement feedback in accordance with the activation message and the configuration message.

5. An apparatus for wireless communications at a user equipment (UE), comprising:
   a processor,
   memory coupled with the processor; and
   instructions stored in the memory and executable by the processor to cause the apparatus to:
      identify an interference tracking configuration comprising a dedicated tracking loop for determining crosslink interference using a dedicated channel;
      measure crosslink interference in accordance with at least one of a plurality of tracking loops, the plurality of tracking loops including the dedicated tracking loop of the interference tracking configuration; and
      transmit, to a base station, measurement feedback based at least in part on the measuring of the crosslink interference.

6. The apparatus of claim 5, wherein the instructions are further executable by the processor to cause the apparatus to:
   receive the interference tracking configuration via a configuration message from the base station;
   receive an activation message that triggers the use of the dedicated tracking loop; and
   measure the dedicated channel in accordance with the activation message and the configuration message.

7. The apparatus of claim 6, wherein the instructions to receive the activation message further are executable by the processor to cause the apparatus to:
   receive the activation message via downlink control information, a medium access control-control entity, or a radio resource control message.

8. The apparatus of claim 5, wherein the interference tracking configuration is a default configuration for determining the crosslink interference.

9. The apparatus of claim 5, wherein the instructions are further executable by the processor to cause the apparatus to:
transmit, to the base station, a tracking loop indicator that indicates whether the measurement feedback is in accordance with the dedicated tracking loop.

10. The apparatus of claim 9, wherein the instructions are further executable by the processor to cause the apparatus to:
transmit the tracking loop indicator with UE capability information regarding a capability of the UE for crosslink interference tracking.

11. The apparatus of claim 9, wherein the instructions to transmit the measurement feedback further are executable by the processor to cause the apparatus to:
transmit the tracking loop indicator with the measurement feedback.

12. The apparatus of claim 5, wherein the instructions are further executable by the processor to cause the apparatus to:
receive, from the base station, an association indication pertaining to an aggressor UE which is a source of the crosslink interference measured by the UE;
receive, from the aggressor UE, a first interfering transmission and a second interfering transmission; and
estimate the crosslink interference arising from the first interfering transmission and the second interfering transmission together based at least in part on the association indication.

13. The apparatus of claim 12, wherein the association indication indicates a resource pattern for the first interfering transmission and the second interfering transmission and indicates that the first interfering transmission and the second interfering transmission are quasi co-located.

14. The apparatus of claim 13, wherein the instructions are further executable by the processor to cause the apparatus to:
receive a dummy parameter indicating a type of quasi co-location of the first interfering transmission and the second interfering transmission.

15. The apparatus of claim 13, wherein the resource pattern indicates whether one or both of the first interfering transmission and the second interfering transmission comprise a received signal strength indicator resource or a reference signal.

16. The apparatus of claim 12, wherein the instructions to receive the association indication further are executable by the processor to cause the apparatus to:
receive the association indication in downlink control information, a medium access control-control element, or a radio resource configuration.

17. The apparatus of claim 12, wherein the association indication indicates use of a UE identifier, a cell identifier, or both to identify the aggressor UE.

18. The apparatus of claim 17, wherein the instructions are further executable by the processor to cause the apparatus to:
receive an identifier of the aggressor UE in the first interfering transmission and in the second interfering transmission; and
estimate the crosslink interference arising from the first interfering transmission and the second interfering transmission together based at least in part on the identifier of the aggressor UE being present in both the first interfering transmission and the second interfering transmission.

19. The apparatus of claim 17, wherein the UE identifier is based at least in part on an international mobile subscriber identity and a paging occasion index, a UE-specific radio network temporary identifier and the cell identifier, a device-to-device identity, a mobile subscriber identification number, or a combination thereof.

20. The apparatus of claim 5, wherein the instructions to measure the crosslink interference are executable by the processor to cause the apparatus to:
receive, from an aggressor UE which is a source of the crosslink interference measured by the UE, a first reference signal earlier in a subframe than symbols in which a sounding reference signal is received; and
measure the crosslink interference based at least in part on the first reference signal.

21. The apparatus of claim 20, wherein the instructions are further executable by the processor to cause the apparatus to:
receive downlink control information indicating a dynamic reference signal configuration, wherein receiving the first reference signal is based at least in part on the dynamic reference signal configuration.

22. The apparatus of claim 20, wherein the first reference signal is a demodulation reference signal or a phase tracking reference signal.

23. An apparatus for wireless communications, comprising:
a processor,
memory coupled with the processor; and
instructions stored in the memory and executable by the processor to cause the apparatus to:
transmit, to a UE, an interference tracking configuration comprising a dedicated tracking loop for determining crosslink interference, at the UE, using a dedicated channel; and
receive, from the UE, measurement feedback based at least in part on the interference tracking configuration.

24. The apparatus of claim 23, wherein the instructions are further executable by the processor to cause the apparatus to:
transmit the interference tracking configuration via a configuration message;
transmit an activation message that triggers the use of the dedicated tracking loop; and
receive, from the UE, the measurement feedback in accordance with the activation message and the configuration message.

25. The apparatus of claim 24, wherein the instructions to transmit the activation message further are executable by the processor to cause the apparatus to:
transmit the activation message via downlink control information, a medium access control-control entity, or a radio resource control message.

26. The apparatus of claim 23, wherein the interference tracking configuration is a default configuration for determining the crosslink interference.

27. The apparatus of claim 23, wherein the instructions are further executable by the processor to cause the apparatus to:
receive a tracking loop indicator that indicates whether the measurement feedback is in accordance with the dedicated tracking loop.

28. The apparatus of claim 27, wherein the instructions are further executable by the processor to cause the apparatus to:
receive the tracking loop indicator with UE capability information regarding a capability of the UE for crosslink interference tracking.

29. The apparatus of claim 27, wherein the instructions to receive the measurement feedback further are executable by the processor to cause the apparatus to:
receive the tracking loop indicator with the measurement feedback.

30. The apparatus of claim 23, wherein the instructions are further executable by the processor to cause the apparatus to:
transmit, to the UE, an association indication pertaining to an aggressor UE which is a source of the crosslink interference measured by the UE; and
transmit, to the aggressor UE, control information scheduling a first interfering transmission and a second interfering transmission.

31. The apparatus of claim 30, wherein the association indication indicates a resource pattern for the first interfering transmission and the second interfering transmission and indicates that the first interfering transmission and the second interfering transmission are quasi co-located.

32. The apparatus of claim 31, wherein the instructions are further executable by the processor to cause the apparatus to:
transmit a dummy parameter indicating a type of quasi co-location of the first interfering transmission and the second interfering transmission.

33. The apparatus of claim 31, wherein the resource pattern indicates whether one or both of the first interfering transmission and the second interfering transmission comprise a received signal strength indicator resource or a reference signal.

34. The apparatus of claim 30, wherein the instructions to transmit the association indication further are executable by the processor to cause the apparatus to:
transmit the association indication in downlink control information, a medium access control-control element, or a radio resource configuration.

35. An apparatus for wireless communications at a user equipment (UE), comprising:
means for identifying an interference tracking configuration comprising a dedicated tracking loop for determining crosslink interference using a dedicated channel;
means for measuring crosslink interference in accordance with at least one of a plurality of tracking loops, the plurality of tracking loops including the dedicated tracking loop of the interference tracking configuration; and
means for transmitting, to a base station, measurement feedback based at least in part on the measuring of the crosslink interference.

* * * * *